United States Patent [19]

Grayson et al.

[11] 4,160,271
[45] Jul. 3, 1979

[54] COSMETIC SELECTION AND DISPLAY SYSTEM

[75] Inventors: Suzanne Grayson, Englewood, N.J.; Dora Schaefer, New York, N.Y.

[73] Assignee: Helena Rubinstein, Inc., New York, N.Y.

[21] Appl. No.: 844,300

[22] Filed: Oct. 21, 1977

[51] Int. Cl.² .................... A45D 44/00; G06F 3/00
[52] U.S. Cl. .................................. 364/400; 35/59; 40/463; 340/365 R
[58] Field of Search ............... 364/400, 526; 35/59, 35/28; 40/52 R; 132/1 R; 340/365 R, 337, 311; 179/100.1 C

[56] References Cited

U.S. PATENT DOCUMENTS

| | | | |
|---|---|---|---|
| 1,629,330 | 5/1927 | Adler ............................. | 35/59 |
| 2,462,606 | 2/1949 | Brodeur ......................... | 35/59 |
| 3,187,321 | 6/1965 | Kameny ......................... | 364/900 |
| 3,596,390 | 8/1971 | Scalice .......................... | 35/59 |
| 3,680,082 | 7/1972 | Zucker .......................... | 340/365 |

Primary Examiner—Errol A. Krass
Attorney, Agent, or Firm—Burgess, Ryan & Wayne

[57] ABSTRACT

A cosmetic analyzer unit has a color index section and a skin index section, with a digital numerical display for each section. Each section of the analyzer contains a plurality of keys by actuation of which an individual may answer multiple choice questions concerning her cosmetic determining characteristics. As the keys of each section are actuated, the corresponding index signal is numerically modified in accordance therewith, so that after all the multiple choice questions of a section have been answered, the corresponding color index or skin index signal is numerically displayed. A display unit is provided for displaying a number of skin color imparting cosmetics, and has keys corresponding to various color index ranges. When an individual presses the key corresponding to the range which includes her color index, skin color imparting cosmetics suitable for use by said individual are illuminated by the display. Another display unit contains a number of skin preparation cosmetics, and keys corresponding to various skin index ranges. When a key is actuated corresponding to a range including the skin index of a particular individual, the skin preparation cosmetics suitable for use by her are illuminated by the display.

17 Claims, 18 Drawing Figures

PART I

PART 2

PART 1

PART 2

PART 3

PART 4

PART 5

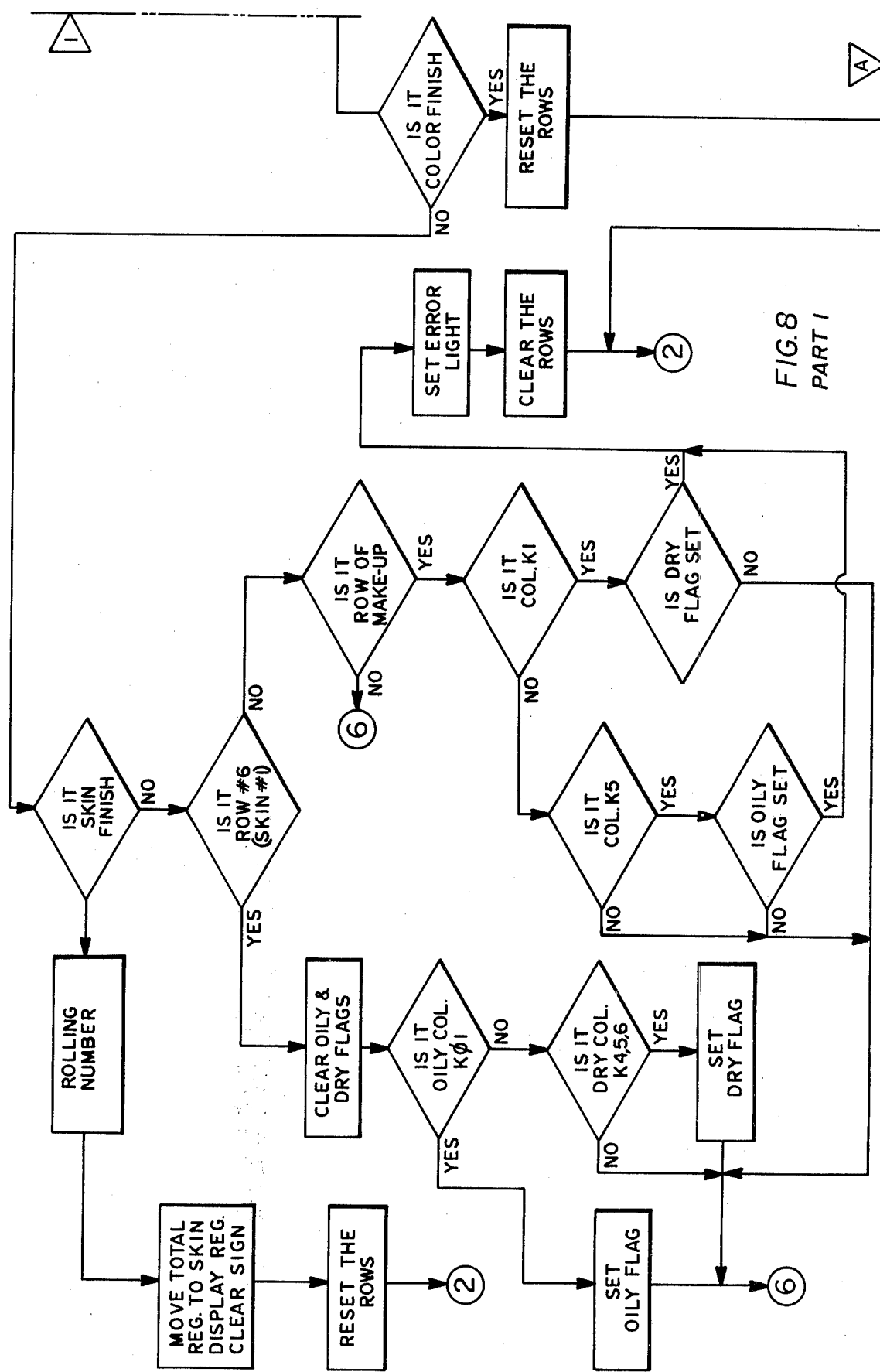
FIG.8 PART 1

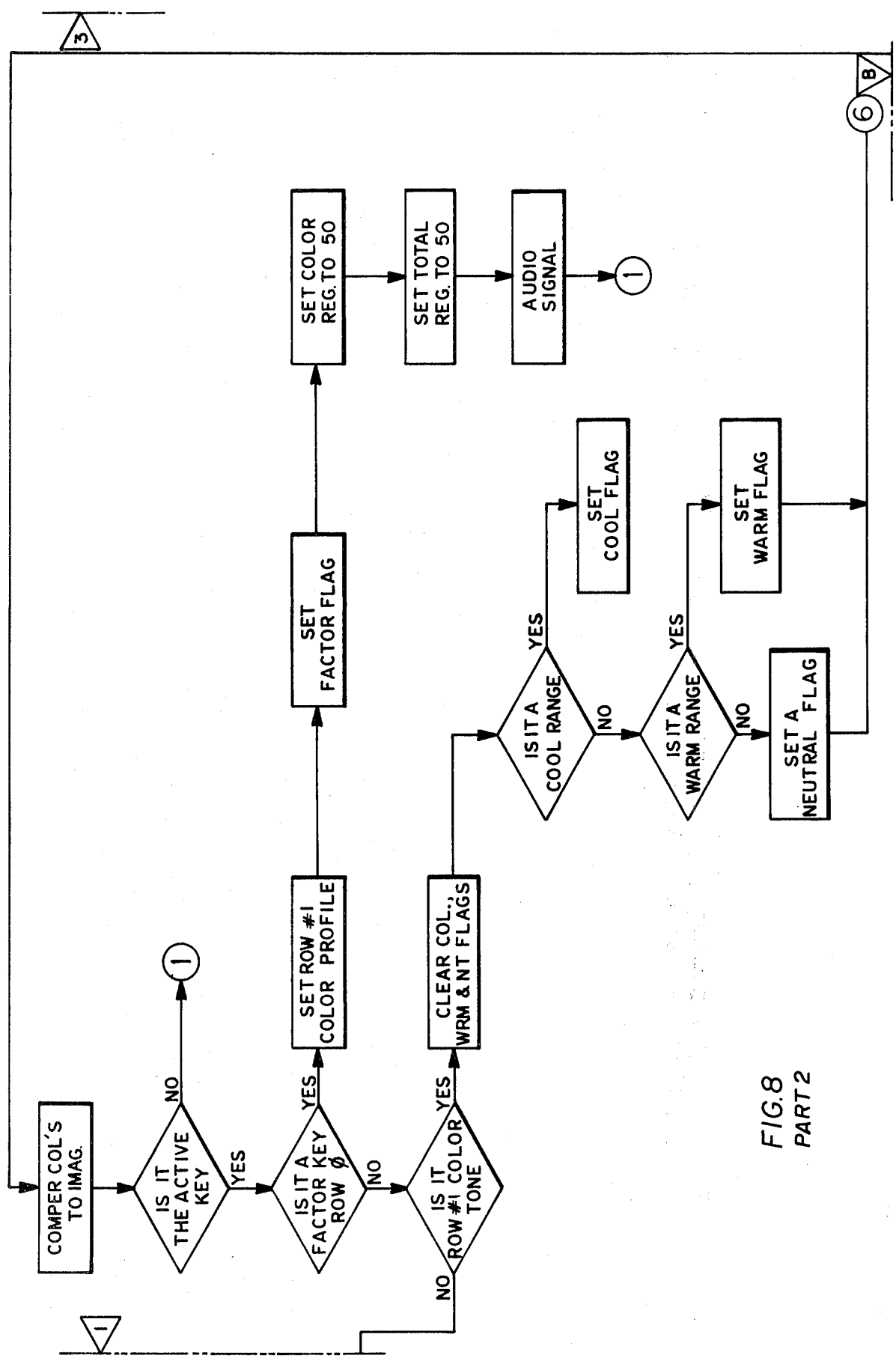
FIG. 8 PART 2

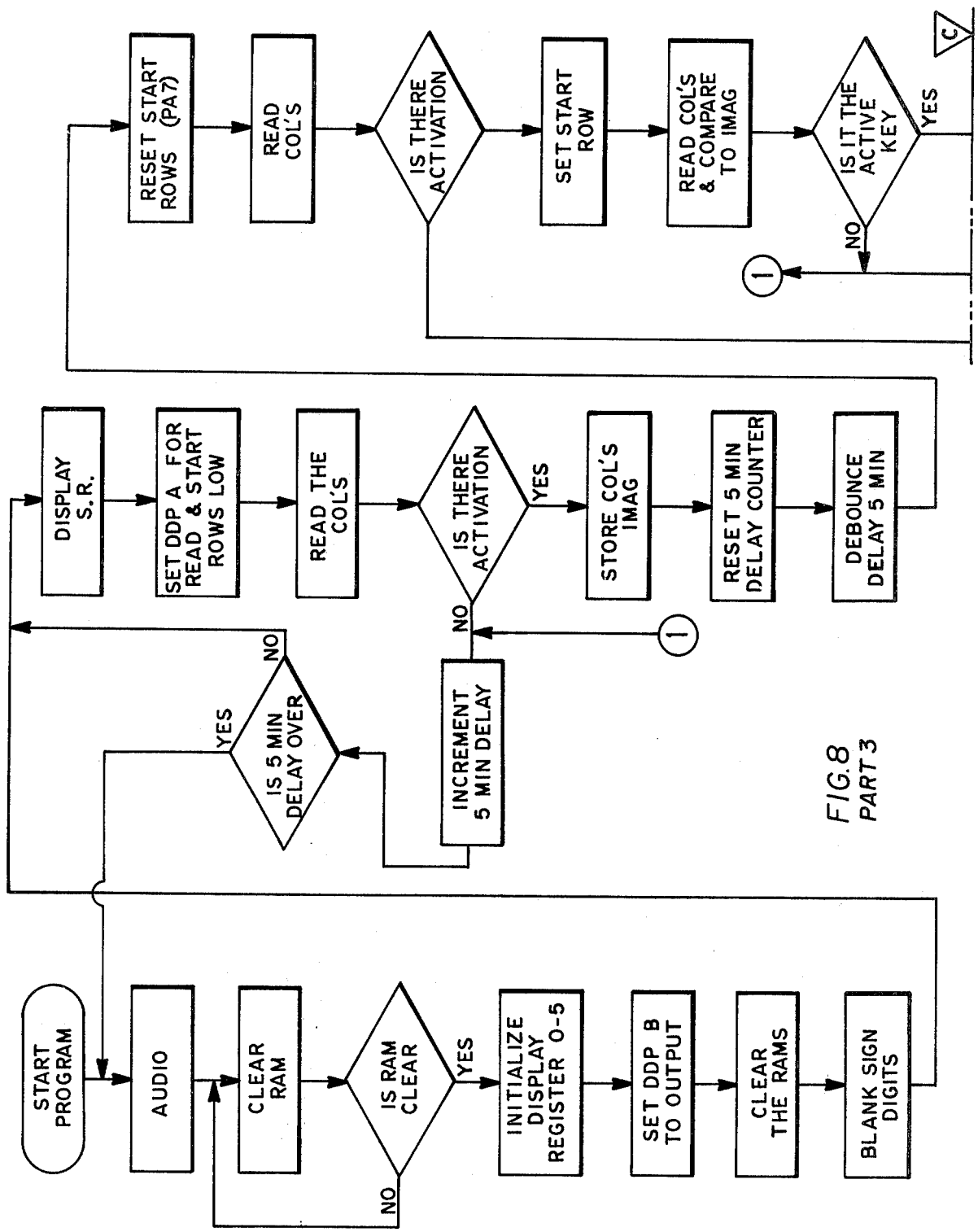
FIG.8 PART 3

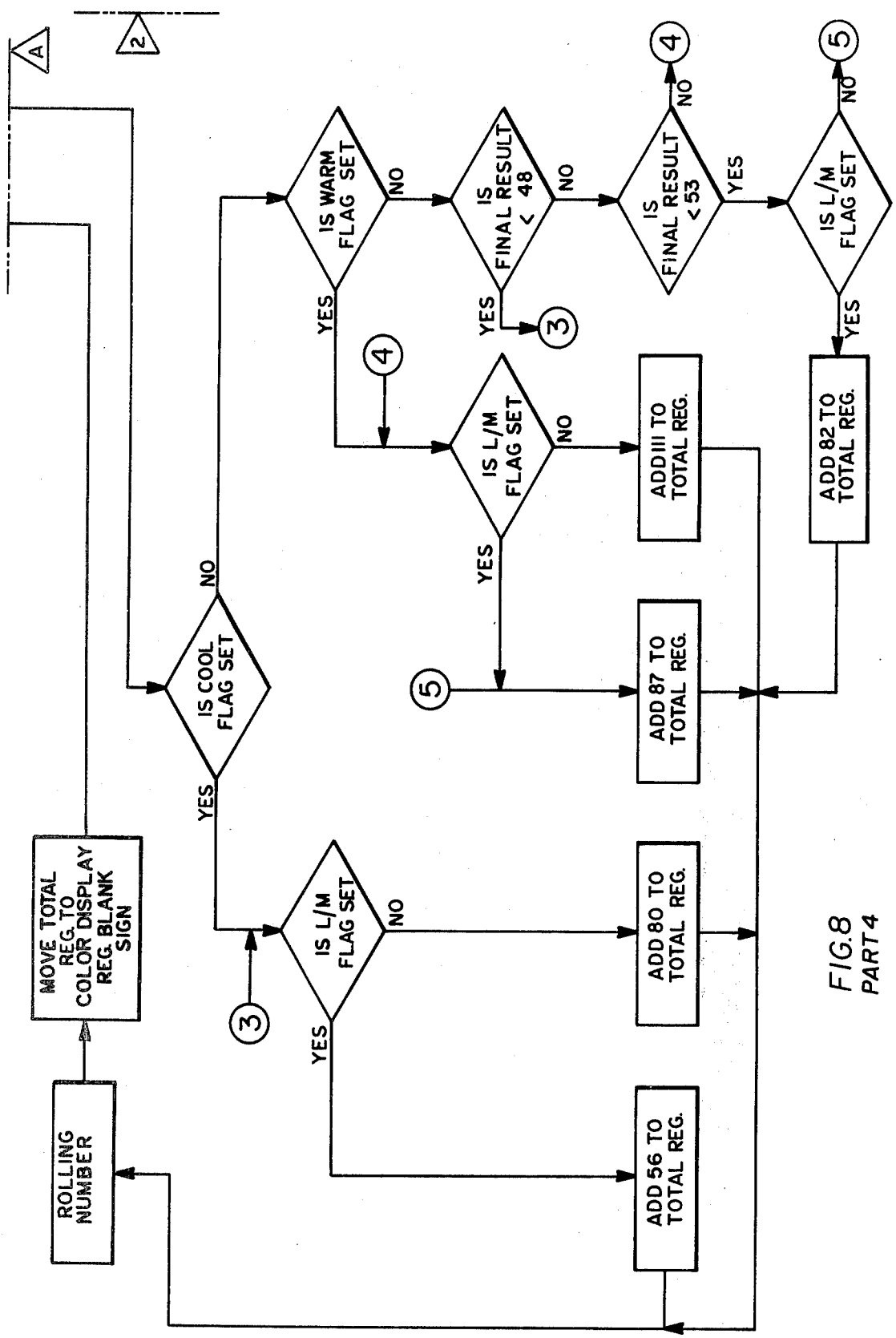
FIG.8 PART 4

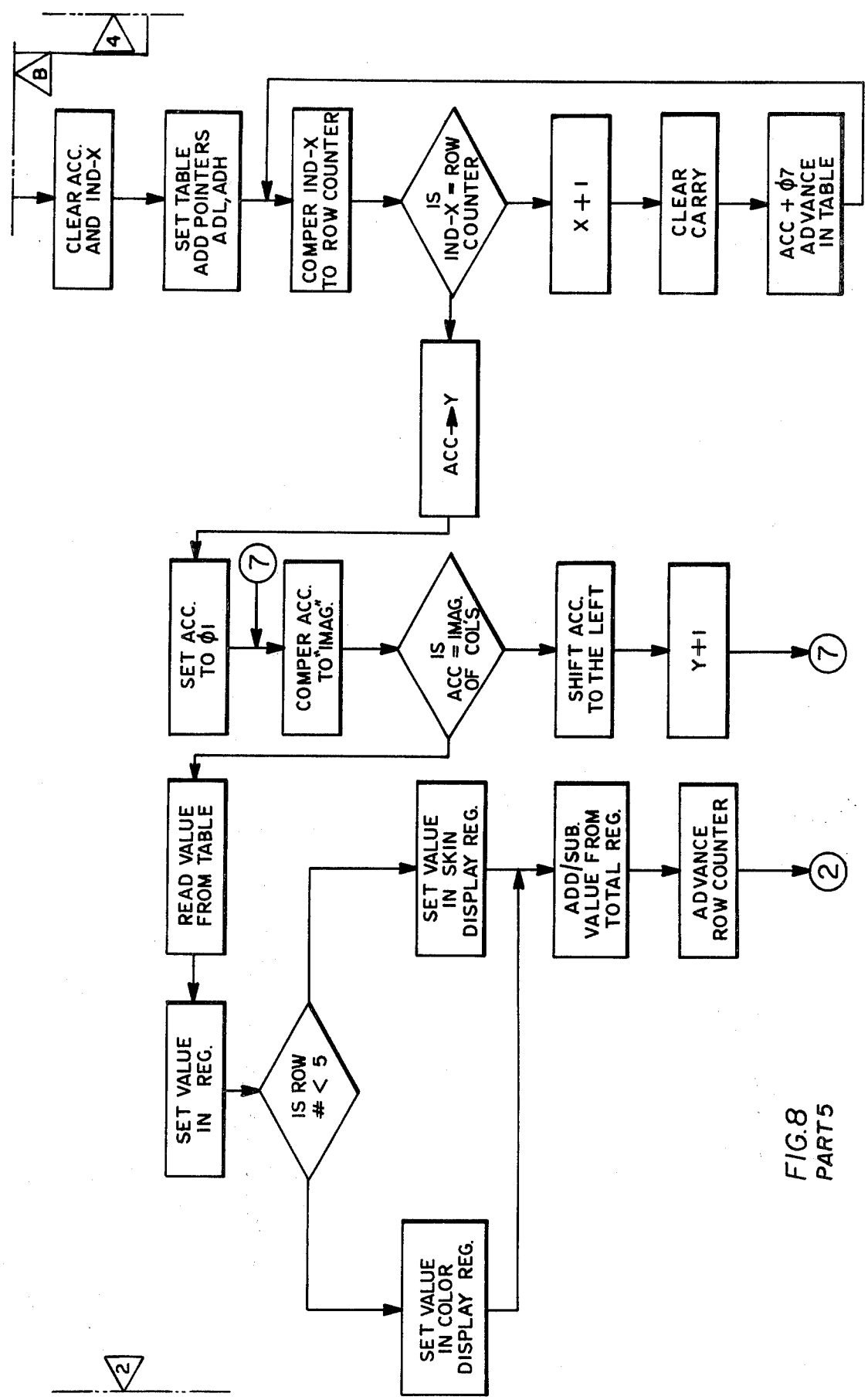
FIG.8 PART 5

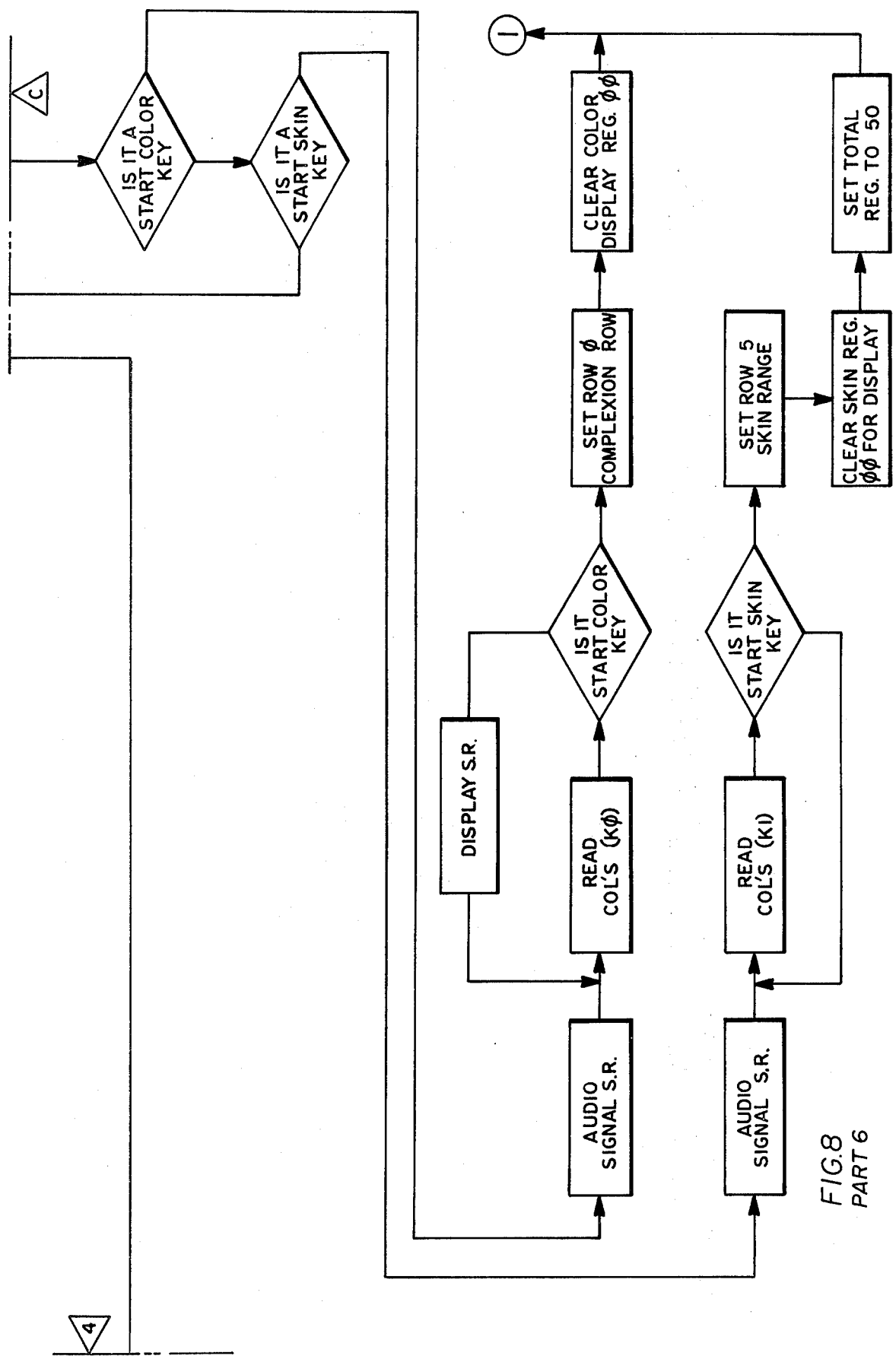

COSMETIC SELECTION AND DISPLAY SYSTEM

This invention relates to a cosmetic selection device, and more particularly to a device for determining the cosmetic requirements of an individual.

Since the color and skin characteristics of women vary greatly from one individual to another, each woman has corresponding individualized requirements for cosmetic products, different combinations of such products being suitable for use by different individuals. Generally speaking, cosmetic products may be divided into two groups, i.e. (i) skin color imparting cosmetics such as makeup, foundation, face powder, lipstick, eye shadow powder, and eye liner, and (ii) skin preparation cosmetics such as cleansers, astringents, fresheners, emulsions, and creams.

At the present time, the sale of such cosmetics requires the presence of a skilled beauty technician to observe each individual and ask her questions concerning her cosmetic determining characteristics. The beauty technician then recommends appropriate cosmetic products for use by the individual. Since such beauty technicians must be trained at substantial expense, and must devote substantial time to each individual, the resultant selling cost is correspondingly increased.

Accordingly, an object of the present invention is to provide a cosmetic selection device by which an individual may determine the cosmetic products which are suitable for her use, taking into account her individual cosmetic determining characteristics.

As herein described, there is provided a cosmetic selection device, comprising keyboard means for generating coded signals representing numerical values corresponding to various cosmetic determining characteristics of an individual; means for combining said coded signals to provide an index signal having a value indicative of a suitable combination of cosmetics selected from a plurality of combinations of cosmetics for use by said individual, and selection means for designating said suitable combination of cosmetics corresponding to the value of said index signal.

Also herein described in a cosmetic analysis device, comprising a keyboard having a plurality of keys for generating corresponding coded signals indicative of various cosmetic determining characteristics of an individual; means responsive to said coded signals for generating a composite cosmetic determining signal having a value corresponding to the combination of the actuated ones of said keys; and means for displaying said composite signal value.

Figure 1:
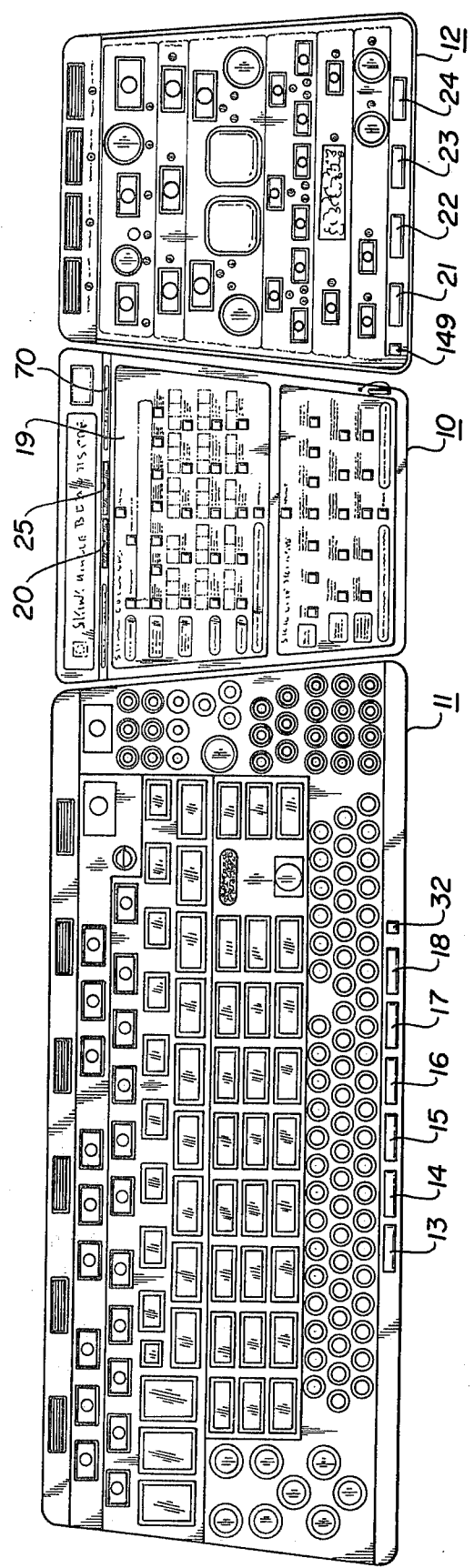
FIG. 1 shows a cosmetic analyzer unit, a skin preparation cosmetic display unit and a skin color imparting cosmetic display unit, according to a preferred embodiment of the present invention.
Figure 2:
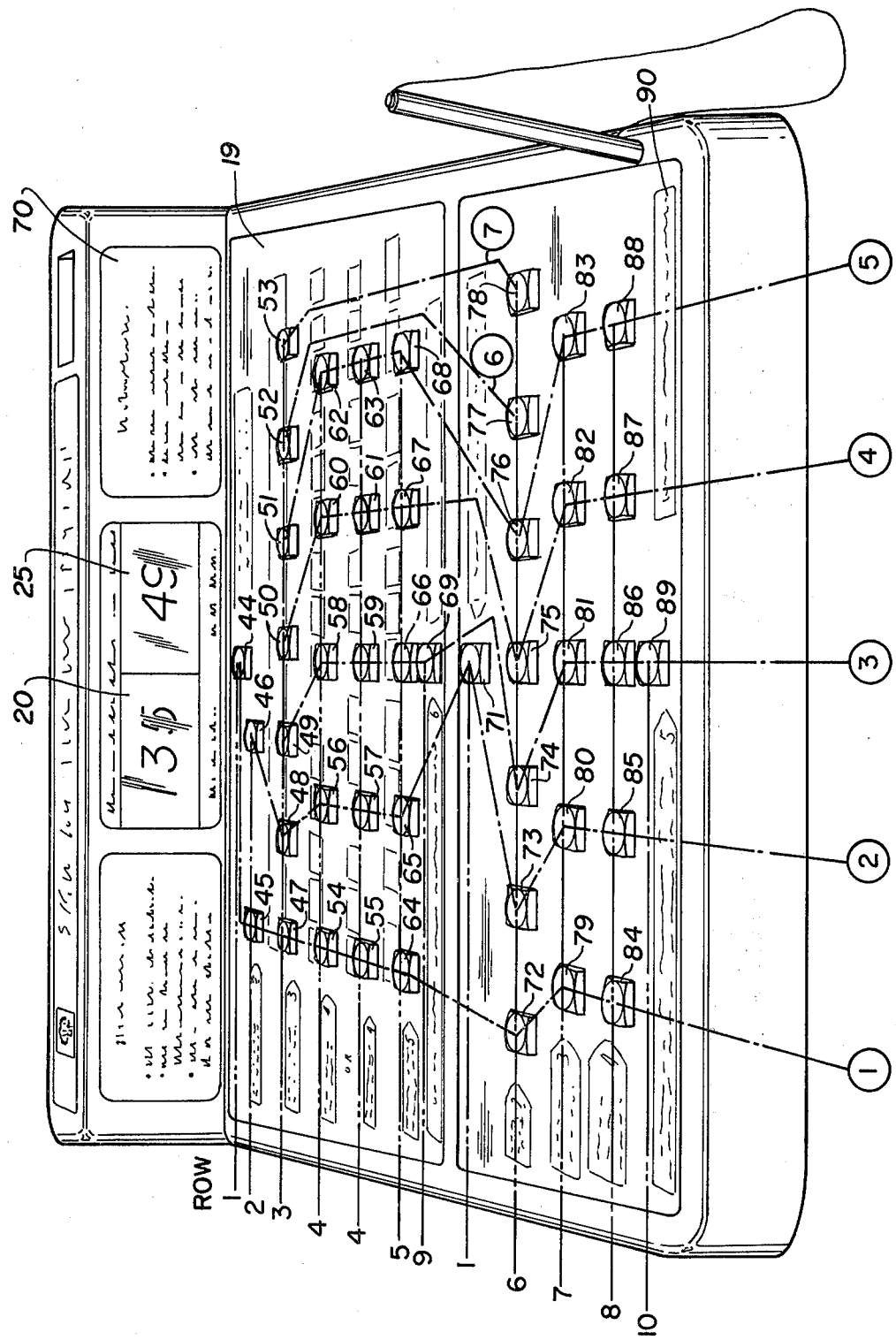
FIG. 2 shows a more detailed perspective view of the analyzer unit of FIG. 1.
Figure 5:
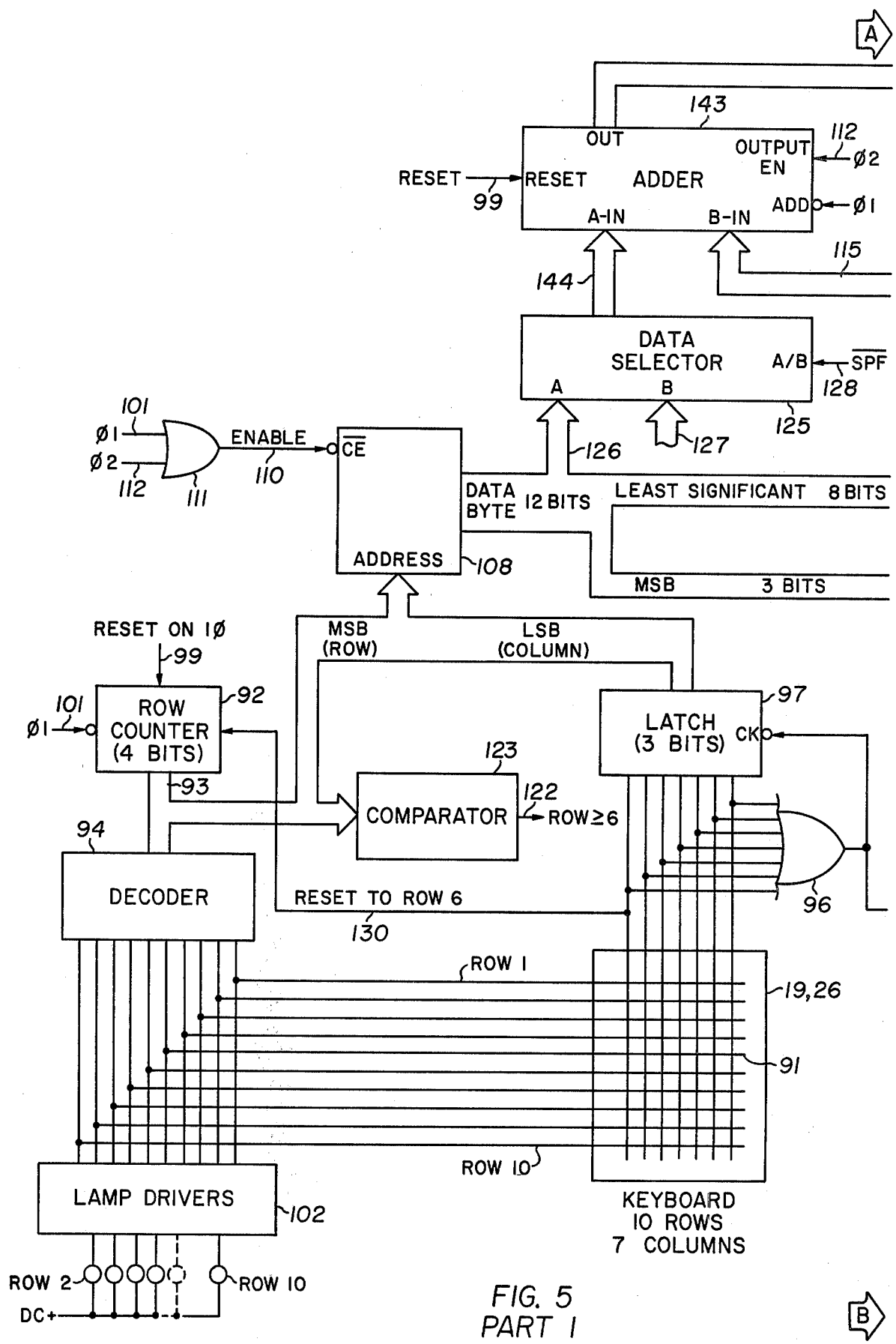
Figure 5:
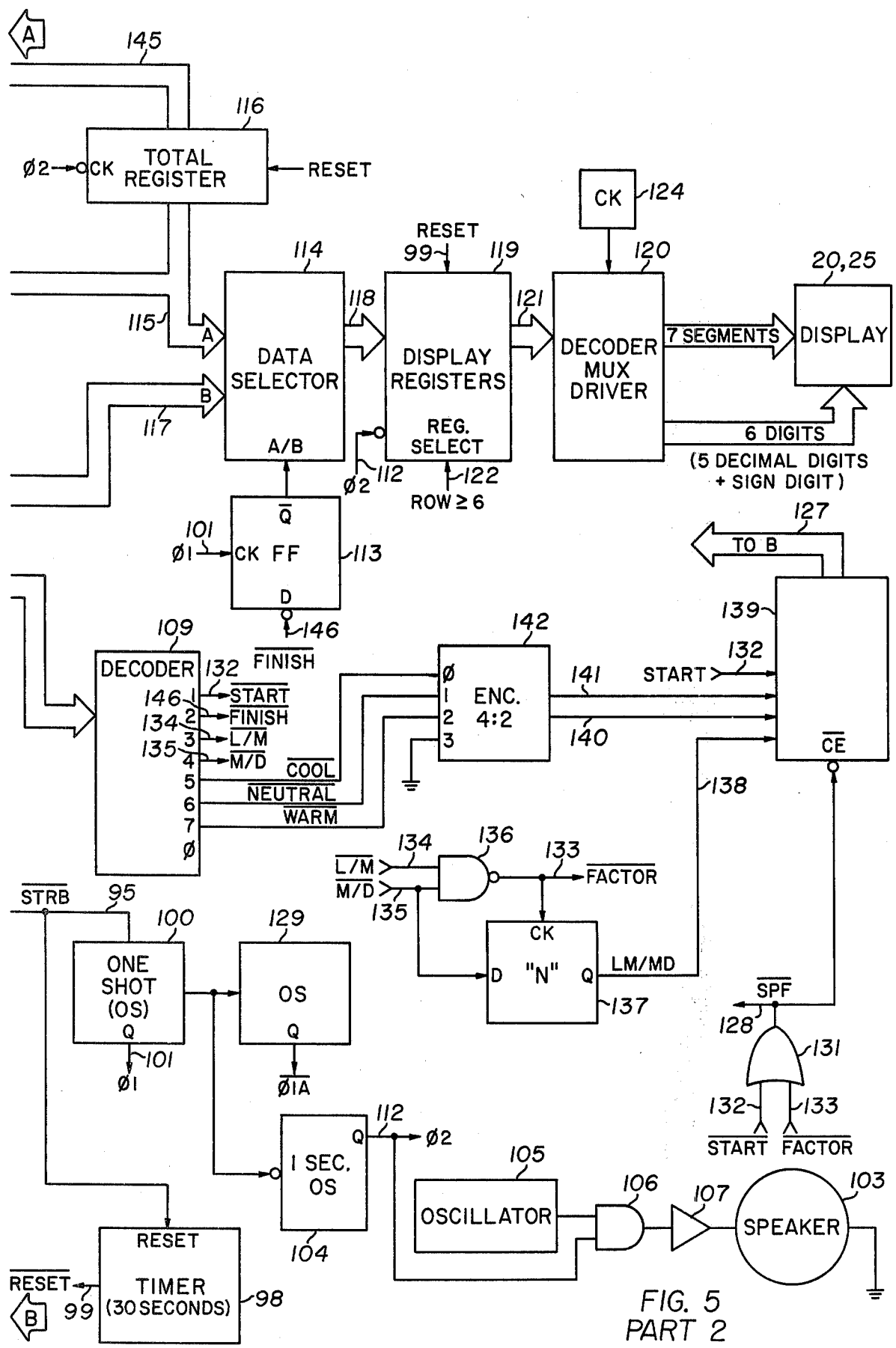
Figure 6:
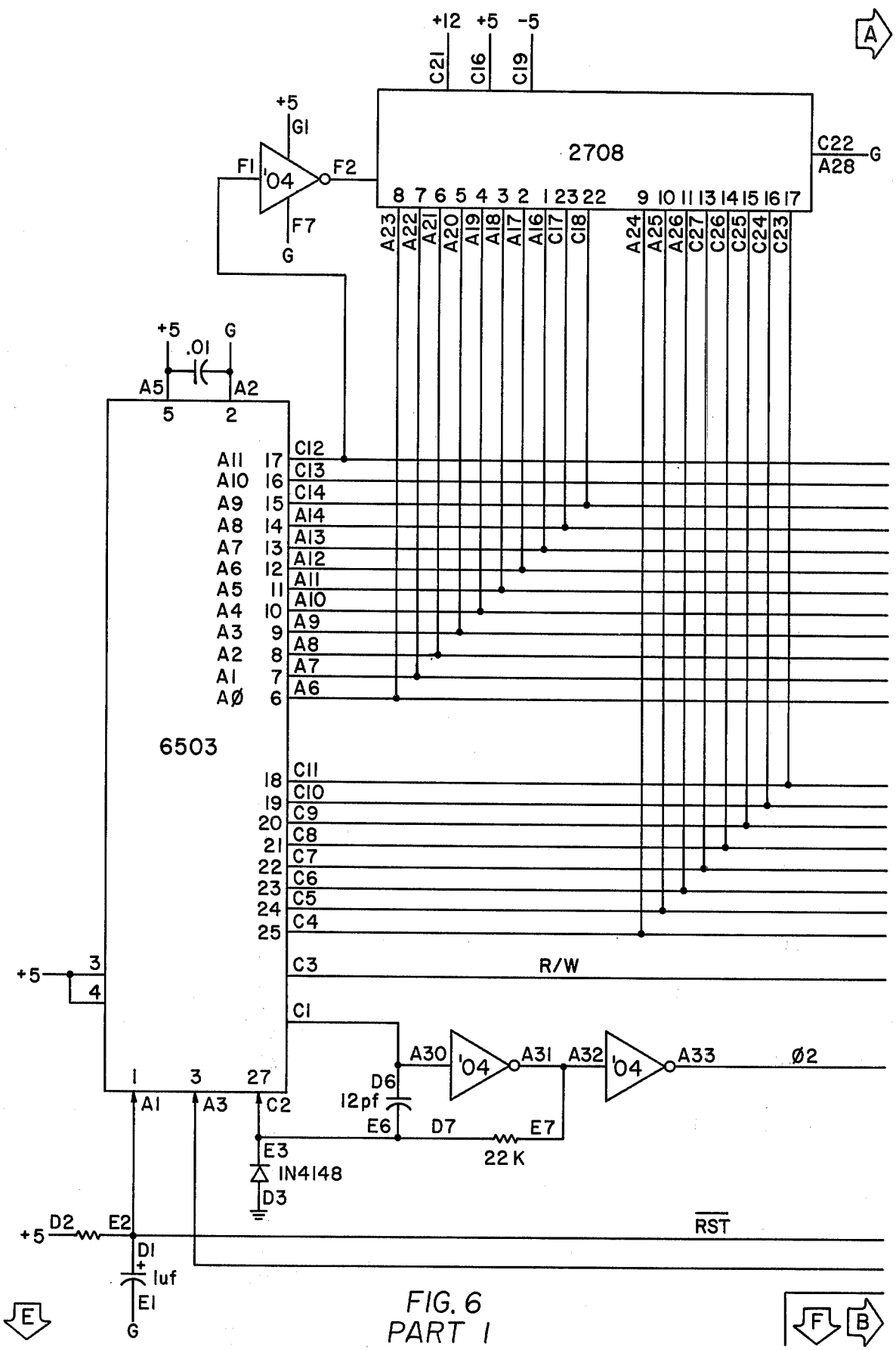
Figure 6:
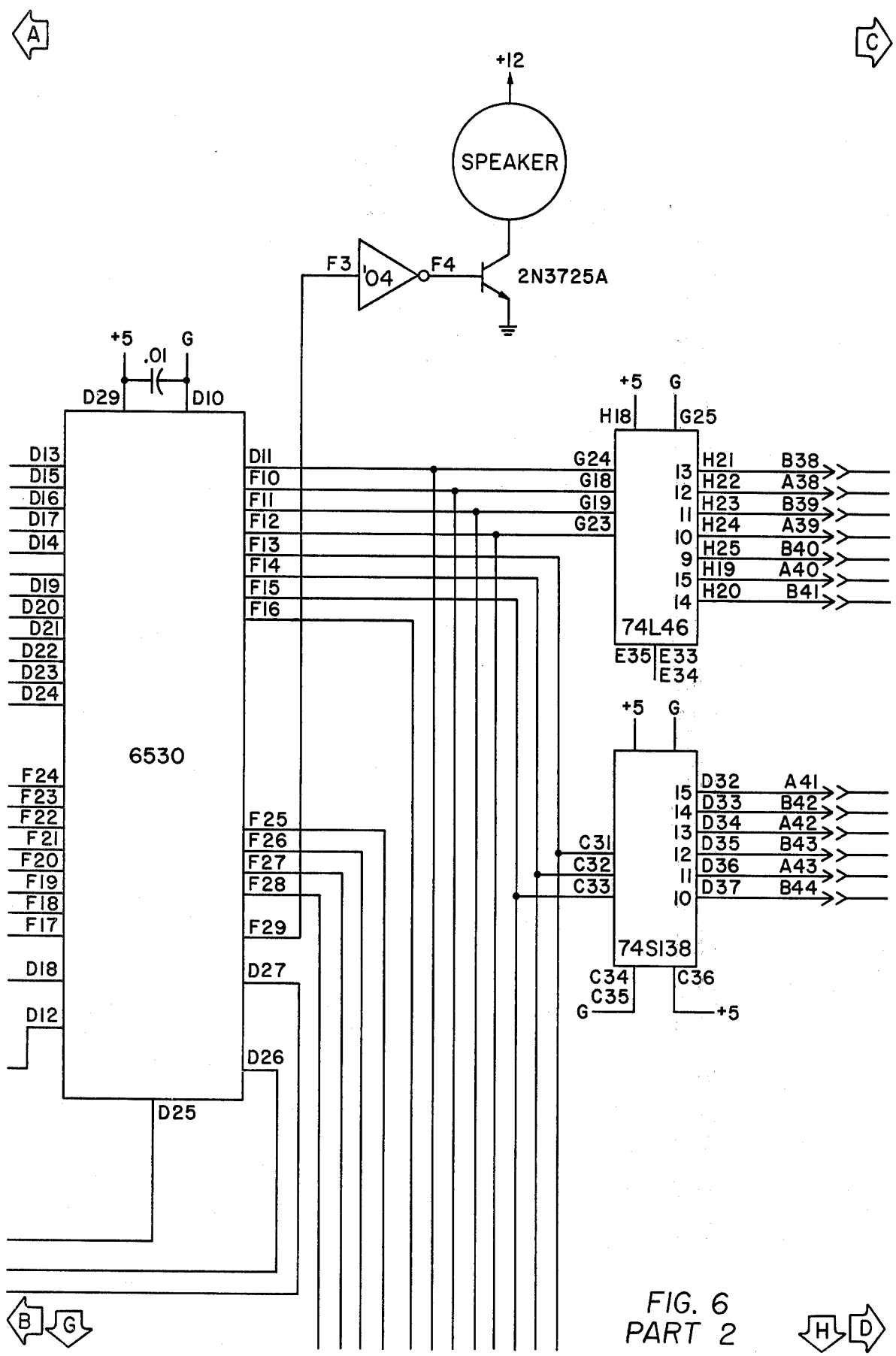
Figure 6:
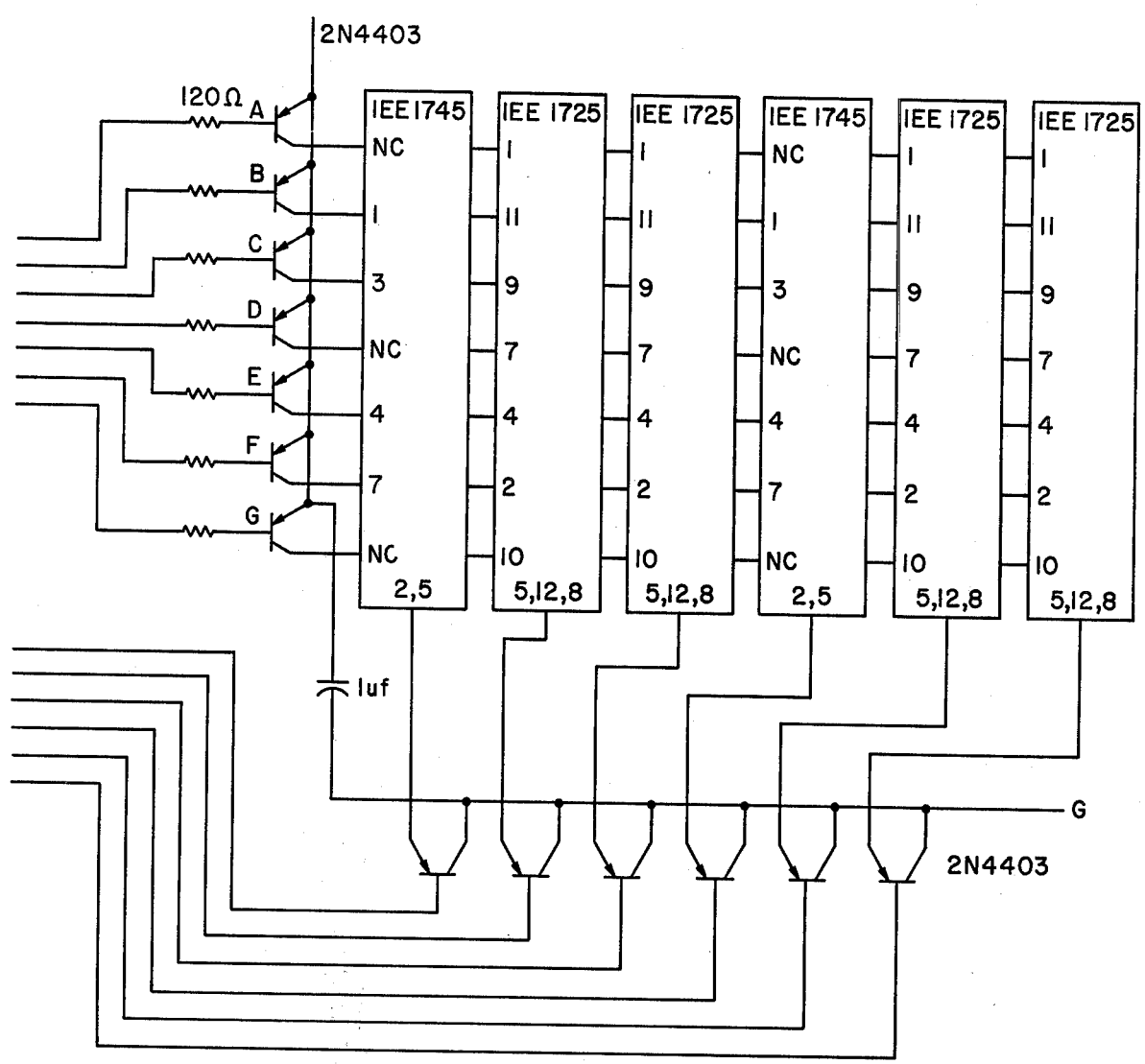
Figure 6:
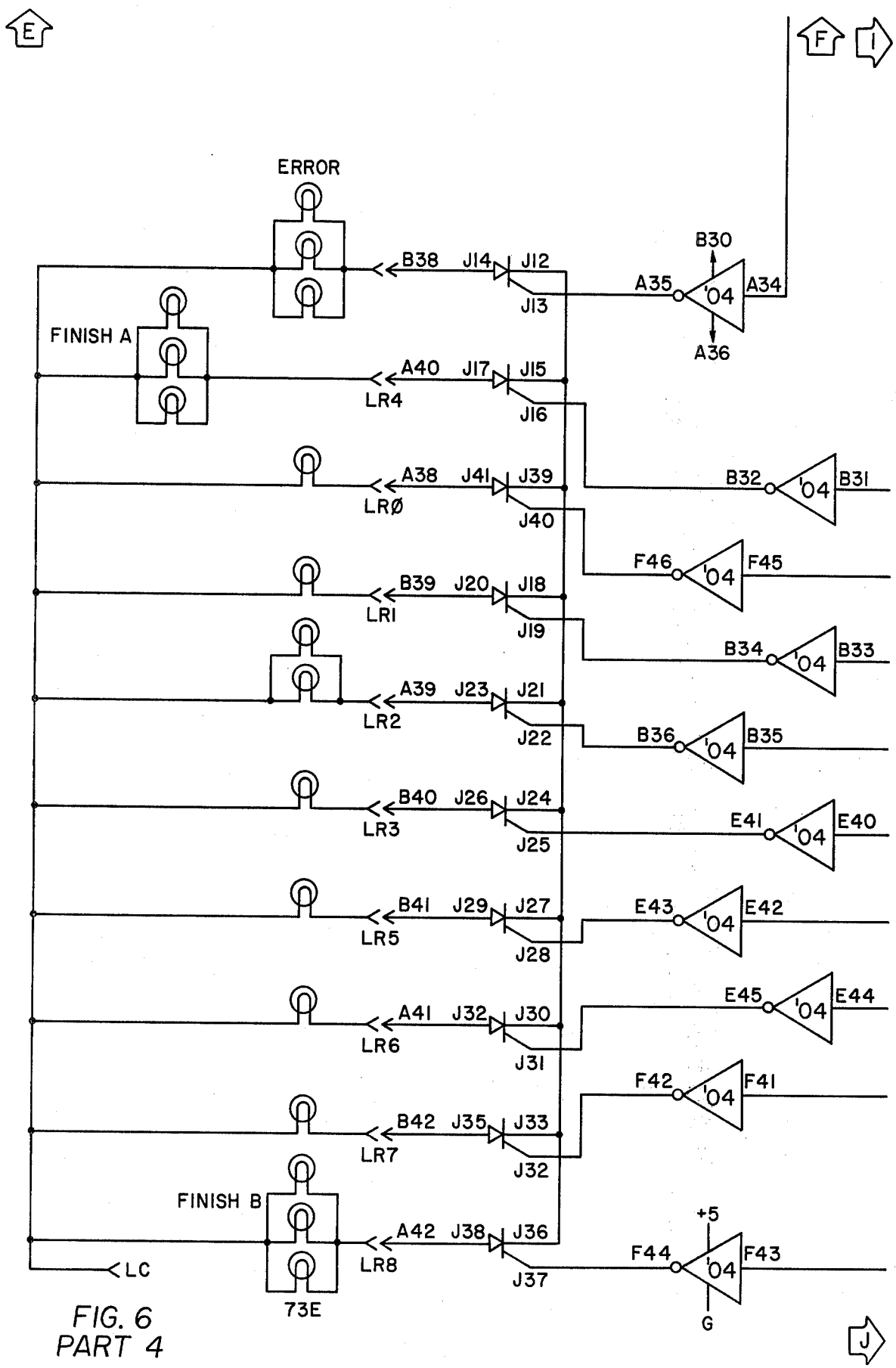
Figure 6:
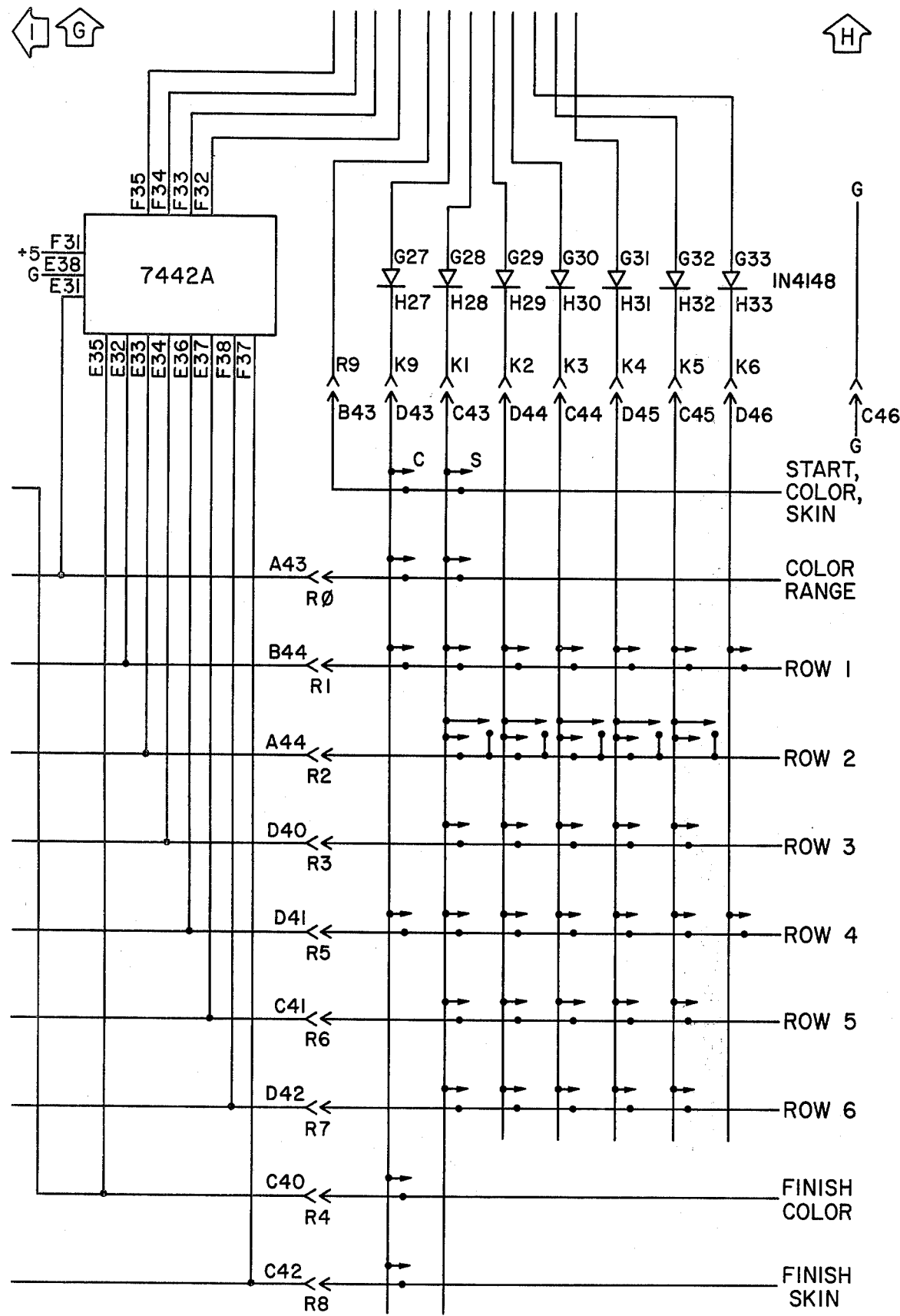
Figure 7:
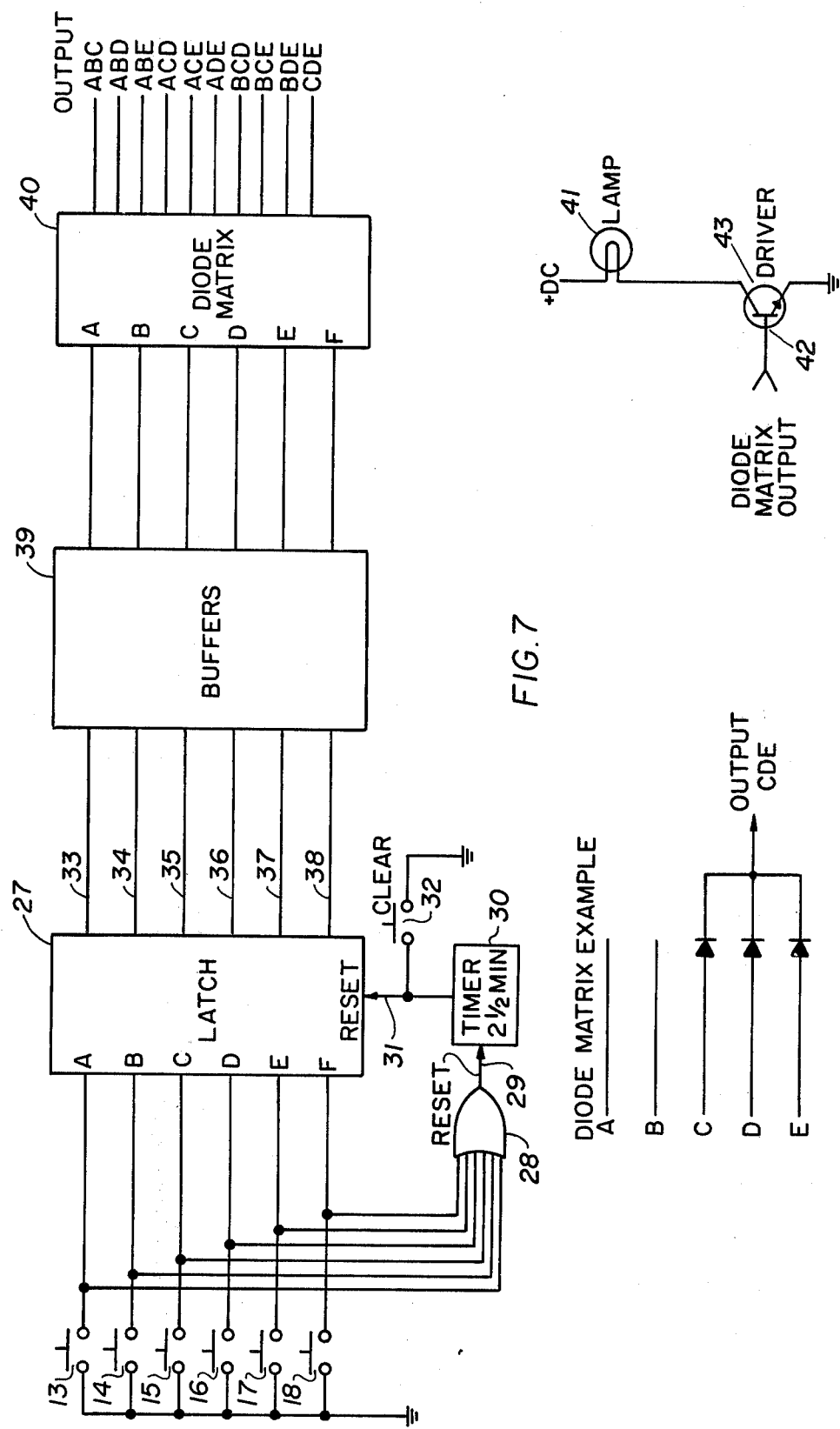

FIG. 5 Part 1 and Part 2, is a functional block diagram of the analyzer unit of FIG. 2;

FIG. 6, Parts 1 to 5, is a wiring diagram of the analyzer unit of FIG. 2;

FIG. 7 is a functional block diagram of the skin color imparting cosmetic display unit shown in FIG. 1, the skin preparation cosmetic display unit shown in FIG. 1 being essentially similar thereto; and FIG. 8, Parts 1 to 6, is a logical flow diagram depicting the operation of the analyzer unit of FIG. 2.

As shown in FIG. 1, the cosmetic selection and display arrangement comprises a selection or analyzer unit 10, a skin color imparting cosmetic display unit 11, and a skin preparation cosmetic display unit 12. The skin color imparting cosmetic display unit 11 comprises a number of receptacles in each of which a corresponding skin color imparting cosmetic product is disposed. Each receptacle is provided with an illuminating lamp controlled by a transistor switch through a diode matrix as hereafter described, so that suitable control circuitry may cause any desired receptacle or combination of receptacles to be illuminated, thereby illuminating the corresponding cosmetic product(s) therein. In the preferred embodiment of the invention, the display unit 11 comprises 147 receptacles with corresponding cosmetic products disposed therein.

Similarly, the skin preparation cosmetic display unit 12 has a number of receptacles for receiving corresponding skin preparation cosmetic products. Each receptacle is individually illuminated under control of a transistor switch coupled to a diode matrix which, in response to signals from a suitable control circuit, illuminates desired receptacles or combinations thereof. In the preferred embodiment of the invention the unit 12 comprises 31 receptacles with corresponding cosmetic products disposed therein.

The skin color imparting cosmetic display unit 11 contains cosmetic products such as makeup, foundation, face powder, cream compact, cheek color, lipstick, eyelid color, eye shadow, and eye liner. At the front of the display unit 11 are six bars 13 to 18 corresponding to the six final color index ranges as determined by the analyzer unit 10. Also provided is a reset button 32. Each range has a corresponding range of numerical index values determined in response to depression of keys of the color index analysis section 19 of the analyzer 10, the resulting color index value being displayed by the digital readout 20.

In the preferred embodiment of the invention, the color index values range from 80 to 187, and the final color index ranges to which the bars 13 to 18 respectively correspond are as follows:

| BAR | COLOR INDEX NUMERICAL RANGE | COLOR INDEX RANGE DESCRIPTION |
| --- | --- | --- |
| 13 | 80 to 130 | cool — light to medium |
| 14 | 104 to 127 | cool — medium to deep |
| 15 | 130 to 134 | neutral — light to medium |
| 16 | 135 to 139 | neutral — medium to deep |
| 17 | 140 to 163 | warm — light to medium |
| 18 | 164 to 187 | warm — medium to deep |

Thus, the individual who desires to purchase skin color imparting cosmetics suitable for her cosmetic determining characteristics, simply depresses whichever of the bars 13 to 18 contains the numerical value displayed in the digital readout 20 corresponding to her color index. When said bar is depressed the recesses surrounding those skin color imparting cosmetics which are suitable for use by individuals having a color index within the corresponding final color index range are illuminated, and the corresponding cosmetics disposed in said receptacle are visually identified, so that the number and identity of said cosmetics is instantly displayed to the user of the device.

Similarly, the skin preparation cosmetic display unit 12 has four skin index range bars 21 to 24 in the front portion thereof, each bar corresponding to particular final skin index range. Also provided is a reset button 149. The individual using the display unit 12 presses that one of the bars 21 to 24 which includes the skin index value displayed in the digital readout 25 of the analyzer unit 10, said value being determined in response to actuation of keys of the skin index section 26 of the analyzer unit 10, indicative of the particular individual's cosmetic determining characteristics. The correlation between the bars 21 to 24 and corresponding skin index final ranges is as follows:

| BAR | SKIN INDEX NUMERICAL RANGE | SKIN INDEX RANGE DESCRIPTION |
| --- | --- | --- |
| 21 | 25 to 38 | A — oily |
| 22 | 39–49 | B — partly oily |
| 23 | 50–54 | C — neutral |
| 24 | 55–75 | D — dry |

While the display units 11 and 12 are not functionally interconnected with the analyzer unit 10, it would be a simply matter to so interconnect them if desired. That is, as described the individual using the arrangement observes the values of the color index and skin index signals as displayed by the digital readouts 20 and 25 respectively, and presses corresponding range bars on the display units 11 and 12. If desired, however, the analyzer unit 10 could be electrically interconnected with the units 11 and 12 to cause the receptacles of cosmetic products corresponding to particular values of said index signals to be automatically illuminated whenever the corresponding index signal values are displayed in either or both of the readouts 20 and 25.

The manner in which the display units 11 and 12 respond to actuation of the corresponding index signal range bars to illuminate the receptacles of related cosmetic products, is relatively simple and is functionally illustrated in FIG. 7.

As seen in FIG. 7, depression of one of the range bars 13 to 18 causes a corresponding signa to be coupled to the latch 27 and to an OR gate 28. The output of OR gate 28 on line 29 causes a 2½ minute timer 30 to be reset. The timer 30 then starts timing the 2½ minute interval, with the output of the timer 30 on line 31 being coupled as a reset signal to the latch 27, so that the illumination of corresponding cosmetic products is terminated 2½ minutes after one of the bars 13 to 18 is depressed. The display unit 11 may also be reset by means of a clear button 32.

When one of the bars 13 to 18 is depressed, the latch 27 generates a signal on the corresponding one of the output lines 33 to 38 thereof, and latches out all the other lines, so that subsequent depression of any other key within the next 2½ mins. (i.e., prior to resetting of the latch 27) has no effect on the resulting display. The signals on lines 33 to 38 are coupled to corresponding buffers indicated generally as 39, the outputs of said buffers being coupled as corresponding inputs A to F of the diode matrix 40.

The diode matrix 40 has one output line for each one of the lamps 41 illuminating a corresponding display receptacle. For example, for the aforementioned skin color imparting cosmetic display unit 11 described above, the matrix 40 would have 147 output lines, each coupled to a base electrode 42 of a corresponding driver transistor 43 having its main (i.e. collector and emitter) electrodes coupled in series with the lamp 41 and a DC power source. The purpose of the diode matrix is simply to enable a particular one of the lamps 41 which is to be illuminated in response to the depression of one or more than one of the bars 13 to 18, to be illuminated as desired.

While FIG. 7 illustrates the operation of the display unit 11, it should be evident that the display unit 12 is operated in essentially the same fashion, except that in the preferred embodiment described above the input signals are derived from the bars 21 to 24, a clear button 149 is provided, and the diode matrix has 31 output lines.

As previously indicated, the analyzer unit 10 has a color index determining section 19 and a skin index determining section 26, with corresponding digital readouts 20 and 25 respectively. The operation of the color index portion of the analyzer 10 is as follows:

As most clearly shown in FIG. 2, the color index section 19 comprises a 24 key keyboard, of which 19 keys are mutually independent. The keys are arranged in a series of rows which are numbered in FIG. 2 as rows 1, 2, 3, 4, 5 and 9 respectively. Although two rows are designated as row 4, these rows are electrically a single row, since in these two rows keys which are vertically above and below each other are electrically interconnected. While five rather than ten keys could have been provided for row(s) 4, duplication of keys was made in order to provide a more esthetically pleasing appearance of the resulting unit, and to accommodate the considerable amount of lettering required for each key function.

The keys of keyboard sections 19 and 26 are also electrically arranged in a row-column matrix, with lines being drawn through the keys in FIG. 2 to indicate which keys are electrically connected to corresponding matrix columns, said columns being identified by the circled numerals 1 to 7 respectively. The skin index section 26 comprises rows 1, 6, 7, 8 and 10 as numbered in FIG. 2, so that the entire keyboard of the analyzer 10 corresponds to an electrical matrix having 10 rows and 7 columns, i.e., a matrix capable of accommodating 70 keys. However, only 40 independent keys are actually present on the panel of the analyzer 10, so that only 40 out of 70 possible matrix values are employed in the preferred embodiment of the invention.

With respect to the color index section 19, row 1 contains a single START key. Rows 2 to 5 contain 2, 7, 5 (from a functional electrical viewpoint) and 5 keys respectively, with the depression of one key of each row corresponding to the answer of a related multiple choice question. The question addressed by row 2 is whether the individual's skin color tone is in the light to medium ("L/M") or medium to deep ("M/D") range. The answer to this question, i.e., depression of one of the corresponding keys 45 or 46, is the most significant factor affecting the choice of suitable color imparting cosmetics for the individual, and accordingly is given the greatest numerical weight in determining the corresponding final color index range for the individual. Row 3 relates to the individual's color range, i.e., complexion, and has 7 possible answers as represented by depression of the keys 47 to 53 respectively. Row 4 relates to the hair color of the individual, and has five possible answers, as represented by depression of the keys 54/55 to 62/63 respectively. Row 5 relates to the eye color of the individual, and has five possible answers represented by depression of the keys 64 to 68 respectively. Row 9 contains a single FINISH key 69.

Figure 3:
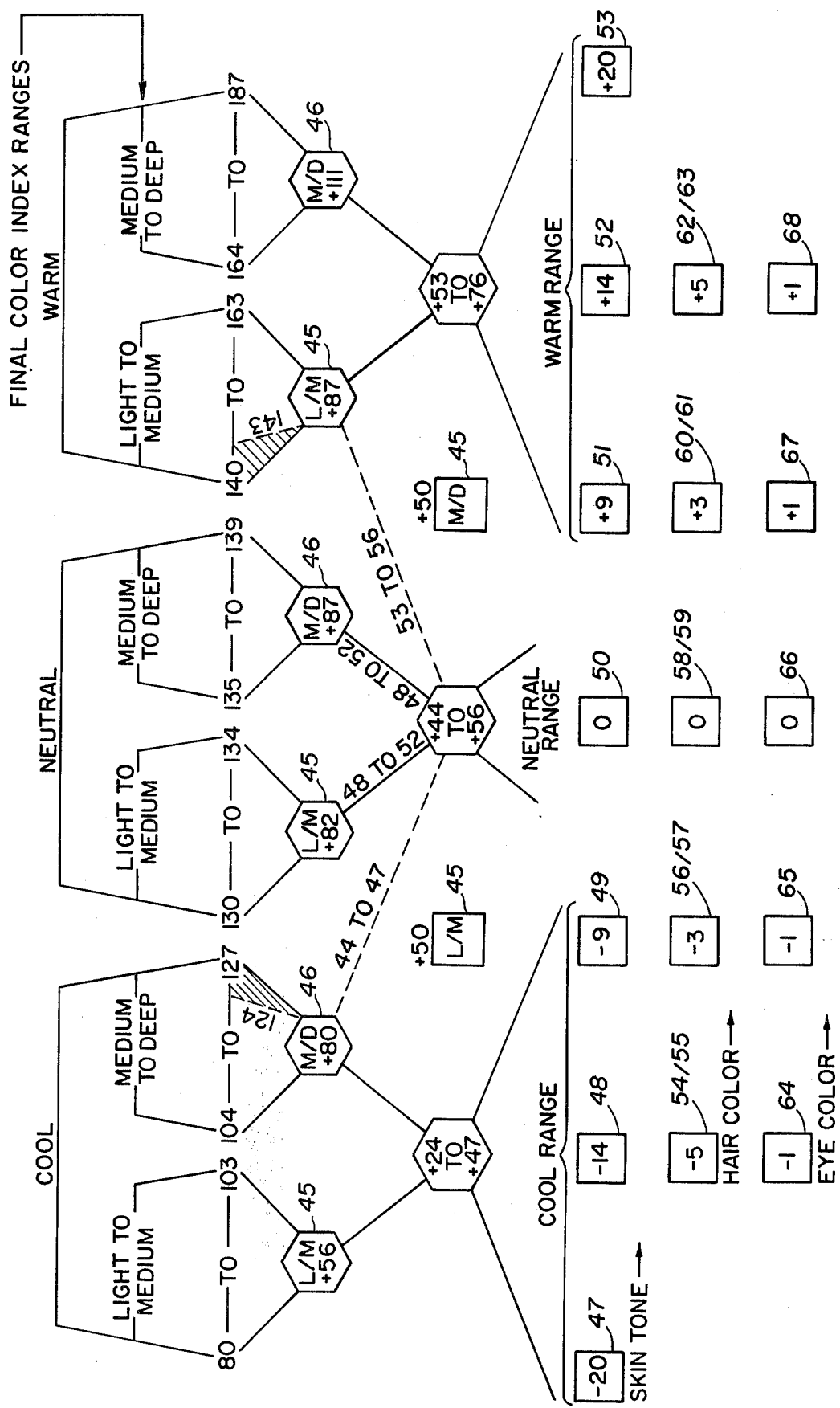
FIG. 3 illustrates the computational scheme employed in determining the color index for an individual, to enable determination of her skin color imparting cosmetic requirements.

Each of the keys 44 to 68 is assigned a positive or negative numerical value or "weight," with said values being combined as hereafter described to generate the composite resulting color index signal to be displayed in the digital readout 20. The numerical values assigned to each of the keys 45 to 68 are indicated in FIG. 3.

Initially, the digital readouts 20 and 25 are inactive and only the instruction area 70 of the analyzer 10 is illuminated. When the START key 44 is depressed, the keys of row 2 are illuminated. The individual using the analyzer 10 then presses whichever of the keys 45 or 46 most closely corresponds to her skin color tone. When said key is depressed, a brief audio tone is generated to inform the individual that corresponding data has been entered. At the same time, the other key of row 2 is rendered inactive, so that further depression of the keys 45 or 46 has no effect, and the keys 47 to 53 of row 3 are illuminated.

The operator then presses that one of the keys 47 to 53 which most closely corresponds to her color range or complexion characteristics. When said key is depressed an audio tone sounds, the other keys of row 3 are locked out, i.e., rendered inactive, and the keys of row 4 are illuminated. A numerical value correspoinding to the depressed one of the keys 47 to 53 is also algebraically added to the value +50 corresponding to depression of either of the keys 45 and 46.

The individual then proceeds to depress that one of the keys 54 to 63 which most closely describes her hair color characteristics. When the key is depressed, an audio tone is heard, the other keys of row 4 are rendered inactive, a numerical value corresponding to the depressed key is algebraically added to the sum of the values corresponding to depression of the keys of rows 2 and 3, and the keys of row 5 are illuminated.

The individual then proceeds to depress that one of the keys of row 5 which most closely describes her eye color characteristics. Again, when said key is depressed the other keys of row 5 are rendered inactive, an audio tone is heard, a corresponding numerical value is algebraically added to the sum of the numerical values corresponding to depression of keys of rows 2, 3 and 4, and the key 69 of row 9 is illuminated.

It should be understood that when reference is made to illumination of the keys of a row, this may be accomplished either by illuminating the keys themselves or by illuminating the descriptive legends at the left side of each row.

When the key 69 is then depressed, the resulting color index value is displayed by the digital readout 20.

The digital readout 20 is initially inactive, as previously mentioned, until the START key 44 is depressed. When the START key 44 is depressed, the digital readout 20 illuminates and displays the value "00". When one of the keys of row 2 is depressed the digital readout 20 displays the numerical value +50. As one key of each of rows 3, 4, 5 is depressed, the digital readout 20 indicates the corresponding positive or negative numerical value for that key. When the FINISH key 69 is depressed, however, the digital readout 20 is caused to indicate the processed algebraic sum of the values corresponding to the depressed keys of rows 2 to 5 i.e., the resultant composite color index signal value.

After depression of the key 69, the color index value is displayed in the readout 20 for a predetermined period of time, e.g., 5 minutes, after which the analyzer 10 returns to its inactive state, with only the instruction area 70 thereof being illuminated. If the individual utilizing the color index analysis section 19 makes an error or decides to start over, it is merely necessary to again press the START key 44 to reset the section 19 for a fresh sequence of operations.

The numerical values assigned to the keys 47 to 68 of the color index section 19 are shown in FIG. 3.

To determine her skin index signal value, the individual operating the analyzer 10 presses the START key 71 of the skin index analysis section 26. This causes the keys of row 6 to be illuminated, and the individual then depresses that one of the keys 72 to 78 which most closely describes her skin oiliness. When said key is depressed, the other keys of row 6 are rendered inactive, and an audio tone sounds, the keys of row 7 are illuminated, and a numerical value corresponding to the depressed key is entered into the computation circuitry of the analyzer unit 10.

The individual then depresses that one of the keys 79 to 83 which most closely describes the effect of makeup applied to her skin without anything under said makeup. When the corresponding key is depressed, the other keys of row 7 are rendered inactive, an audio tone sounds, the keys of row 8 are illuminated and a numerical value corresponding to the depressed key is algebraically added to the numerical value corresponding to the previously depressed key of row 6.

The individual then depresses that one of the keys 84 to 88 which mostly closely describes the effect of cleansing her skin with soap and water. When said key is depressed, the other keys of row 8 are rendered inactive, an audio tone sounds, the FINISH key 89 is illuminated, and a corresponding numerical value is algebraically added to the sum of the values corresponding to the previously depressed keys of rows 6 and 7.

When the FINISH key 89 is depressed, the resultant composite skin index signal value is displayed by the digital readout 25.

As previously mentioned, the digital readout 25 is initially inactive. When the START key 71 is depressed the readout 25 illuminates and displays the value "00." As one key of each of rows 6, 7 and 8 is depressed, the corresponding numerical value is displayed by the readout 25 and, when the FINISH key 89 is depressed, the processed algebraic sum of said values is displayed as the composite resultant skin index signal value.

Since the depression of certain combinations of keys of the skin index section 26 represents an inconsistency, depression of such combinations is "forbidden" and causes the ERROR region 90 of the skin index section 26 to illuminate.

Specifically, the ERROR region 90 illuminates when the key 83 has been depressed and either of the keys 72 and 73 has also been depressed; and when the key 79 has been depressed and any of the keys 76, 77 and 78 has also been depressed.

As in the case of the color index section 19, the individual using the skin index section 26 may reset the section at any time and begin a new analysis merely by depressing the START key 71. Also, the section 26 will render itself inactive a predetermined time, e.g. five minutes, after the FINISH key 89 has been depressed.

An additional reset feature is provided utilizing a thirty second time delay between adjacent rows. That is, if any key of any row (except one of the FINISH keys 69 or 89) is depressed, and a key of the next row is not depressed in thirty seconds, the analyzer unit 10 is rendered inactive.

Figure 4:
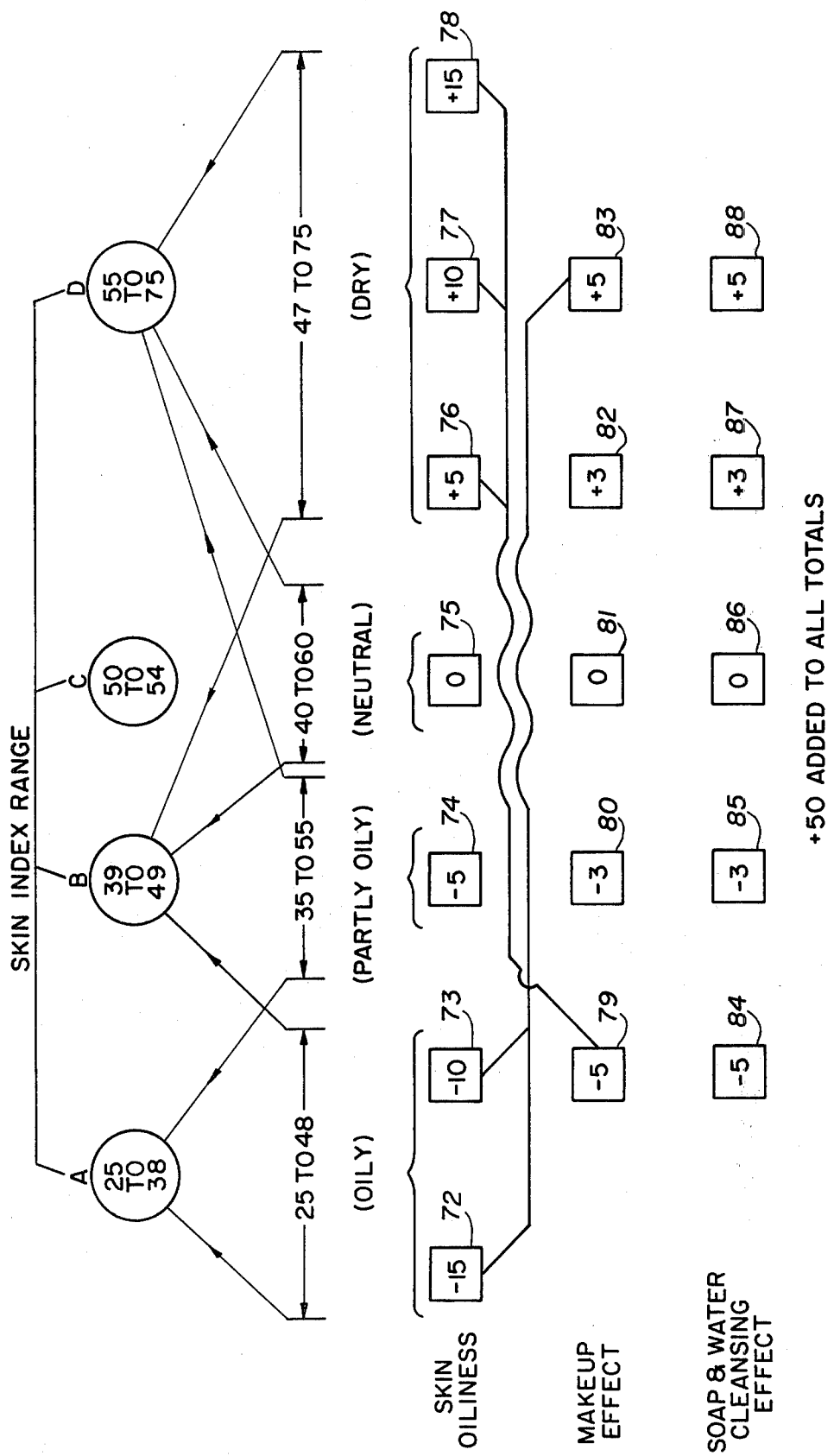
FIG. 4 illustrates the computational scheme employed in determining the skin index of an individual, for use in determining her skin preparation cosmetic requirements.

The numerical values assigned to the keys 72 to 88 of the skin index section 26 are shown in FIG. 4.

The manner in which the final color index ranges are determined is illustrated in FIG. 3, which also shows the numerical values assigned to the various keys 45 to 68 of the color index section 19 of the analyzer unit 10.

Keys 47 to 49 correspond to the cool range of skin tones, key 50 corresponds to the neutral range thereof, the keys 51 to 53 correspond to the warm range of skin tones. The value +50 is generated when either key of row 2 is depressed, said value of +50 being algebraically added to the values corresponding to keys subsequently depressed. Therefore the minimum value corresponding to the cool range is plus 24, i.e. the algebraic sum of the value +50 with the values corresponding to depression of keys 47, 54/55 and 64. The maximum value for the cool range is +47, corresponding to depression of keys 49, 62/63 and 68. Similarly, numerical values for the neutral range run from 44 to 56, and for the warm range from 53 to 76.

It has been found that even though the neutral range skin tone key 50 may be depressed, if keys of rows 4 and 5 corresponding to extremes of the range are depressed, the characteristics of the individual may be at the high end of the cool range or the low end of the warm range. Thus, it has been found that best results are achieved when the neutral range is limited to values from 48 to 52, with values from 44 to 47 being assigned to the high end of the cool range, and values from 53 to 56 being assigned to the low end of the warm range.

When the computed value as mentioned above falls in the cool range, said value is increased by +56 if the L/M key 45 has been depressed, and by +80 if the M/D key 46 has been depressed. Similarly, if the computed value is in the neutral range, said value is increased by +82 if the L/M key 45 has been depressed, and by +87 if the M/D key 46 has been depressed. Finally, if the computed value is in the warm range, said value is increased by +87 if the L/M key 45 has been depressed, and by +111 if the M/D key 46 has been depressed.

After modifying the algebraic sums of the values corresponding to the depressed keys as described above, the resulting color index signal has a value ranging from 80 to 187 (the values 128 and 129 being unused), corresponding to the aforementioned six final color index ranges.

The manner in which the final skin index ranges A, B, C and D are computed is illustrated in FIG. 4. As seen in FIG. 4, the value +50 is added to the algebraic sum of the values corresponding to depressed keys of rows 6, 7 and 8. Again, there is some overlap between ranges, since, e.g., even though one of the "oily" keys 72 and 73 may have been depressed, depression of the keys at remote ends of subsequent rows may result in the individual having a characteristic which falls within skin range B. Similarly, although the "partly oily" key 74 is depressed, depending upon the keys of subsequent rows which are depressed, the resulting characteristics may fall anywhere between skin ranges A and D. Depression of the "neutral" key 75 in combination with the keys of other rows may result in a skin characteristic between range B and D, as may depression of any of the "dry" keys 76 and 78 in conjunction with remote keys of the other rows.

The broken lines shown in FIG. 4 illustrate the forbidden combinations of depressed keys previously described.

The particular values or characteristics corresponding to the keys of the keyboards of the analyzer unit 10, are set forth in Table 1 below.

TABLE I
KEYBOARD MATRIX

| ROW | | |
|---|---|---|
| 1 | | Start Color Analysis or Start Skin Analysis |
| 2 | | Color Range ("My Complexion is Essentially") |
| 3 | | Skin Color Tone |
| 4 | | Hair Color |
| 5 | | Eye Color |
| 6 | | Skin Oiliness ("Skin Usually Looks") |
| 7 | | Makeup Effect ("Without Anything Under My Makeup") |
| 8 | | Soap & Water Cleansing Effect ("5 Minutes After Cleansing My Face with Conventional Soap and Water") |
| 9 | | Finish Color Analysis |
| 10 | | Finish Skin Analysis |

| ROW | COLUMN | |
|---|---|---|
| 1 | 1 | Start Colorscope |
| 1 | 2 | Start Skinscope |
| 2 | 1 | Light-to-Medium |
| 2 | 2 | Medium-to-Deep |
| 3 | 1 | Widespread Redness |
| 3 | 2 | Some Redness |
| 3 | 3 | Uneven Tone — Redness on Nose, Cheeks |
| 3 | 4 | Even Tone — No Excess Pink or Peach |
| 3 | 5 | Even Tone — Slightly Peach or Golden |
| 3 | 6 | Slightly Grey or Pale Olive |
| 3 | 7 | Tan, Brown or Very Olive |
| 4 | 1 | Silver, Grey, White, Platinum, Auburn, Mahogany or Henna, Reddish Brown |
| 4 | 2 | Strawberry Blonde, Reddish Blonde, Mixed Grey Slate, Blue Black |
| 4 | 3 | Champagne, Beige Blonde, Wheat Blonde, Light Ash or Brown, Medium to Dark Brown, Black |
| 4 | 4 | Ash Blonde, Frosted Blonde, Warm Blonde, Warm Brown, Ginger, Rusty |
| 4 | 5 | Pale Gold, White, Honey Blonde, Golden Blonde, Golden Brown, Copper, Golden Copper |
| 5 | 1 | Grey or Blue-Grey |
| 5 | 2 | Violet or Blue |
| 5 | 3 | Grey-Brown, Brown or Dark Brown |
| 5 | 4 | Golden Brown or Hazel |
| 5 | 5 | Grey-Green or Green |
| 6 | 1 | Very Oily All Over |
| 6 | 2 | Slightly Oily All Over |
| 6 | 3 | Partly Oily Around Forehead, Nose & Chin, Cheeks may be dry |
| 6 | 4 | No Oily Shine, no tightness or dry patches |
| 6 | 5 | Slightly dry; beginning of fine lines, slight tight feel |
| 6 | 6 | Fairly dry with moderate lines & tight feel |
| 6 | 7 | Very dry with severe tightness. Many lines, or chapped, rough areas. |
| 7 | 1 | Makeup gets an overall shine very quickly. |
| 7 | 2 | Shines up in the forehead, nose or chin area only. |
| 7 | 3 | Makeup usually applies easily but freshness fades in a few hours. |
| 7 | 4 | Makeup pulls slightly on application. Looks dry or patchy in a few hours. |
| 7 | 5 | Makeup is hard to blend. Soon looks very dry, flat and tired. Powder makes skin look, feel dry. |
| 8 | 1 | Skin feels clean and fresh. Sometimes dry, only in the eye area. |

TABLE I-continued
KEYBOARD MATRIX

| 8 | 2 | Cheeks and eye area feel slightly dry and tight. Nose and chin feel clean. |
|---|---|---|
| 8 | 3 | Eye area feels dry. Face may feel tight in winter or in dry climates. |
| 8 | 4 | Skin feels slightly tight and dry all over. Usually needs moisturizer. |
| 8 | 5 | Skin feels very tight dry and baky - even irritated. Needs moisturizer immediately. |

The operation of the analyzer unit 10 in the manner described above may be realized by those skilled in the art by a number of circuit arrangements, both hard-/wired and comprising software. However, it should be clearly understood that the invention resides in the structural elements recited in the claims and not necessarily in any particular hardware or software arrangement which may be employed in connection with a portion of a specific embodiment thereof.

FIG. 5 is a functional block diagram showing one possible arrangement for mechanizing the aforementioned operation of the analyzer unit 10.

As previously described, the keys of the color index and skin index keyboard sections 19 and 26 of the analyzer 10 are arranged in an electrical matrix 91 comprising ten rows and seven columns. Initially, the digital row counter 92 is in its reset state, with an output on lines 93 to the decoder 94 such that the decoder 94 has an output only on the line corresponding to row 1 of the matrix 91. Thus, only row 1, i.e. the row containing START keys 44 and 71, is initially energized. When one of these start keys is depressed, a strobe signal is coupled to line 95 via OR gate 96, and a corresponding signal is coupled to the latch 97. The latch 97 responds to the strobe signal on line 95 to latch the corrsponding signal, e.g. the signal on row 1, column 1 corresponding to depression of the START key 44 of the color index section 19. At the same time the latch disengages or "ignores" signals from the other lines corresponding to columns 2 to 7 respectively.

The strobe signal on line 95 is also coupled to a monostable multivibrator or timer 98, of the retriggerable type, which generates a reset signal to the row counter 92 on line 99 unless another strobe signal on line 95 is generated within 30 seconds. The strobe signal on line 95 is also coupled to another monostable multivibrator 100, which generates a signal $\phi 1$ to step the row counter 92, said stepping signal being generated on line 101 a short time, e.g. 0.1 second, after occurrence of the strobe signal on line 95. The stepping signal $\phi 1$ causes the row counter to increase its count by one bit, so that the output of the decoder 94 causes row 2 of the electrical matrix 91, i.e. of the keyboard 19, to be rendered active. At the same time, the signal from the decoder 94 is coupled to the lamp drivers 102 to cause the lamp(s) which illuminates row 2 to be energized. Depression of subsequent keys of subsequent rows of the keyboard 19 causes similar operation of the latch 97, generation of a strobe signal for each key on line 95, and stepping of the counter 92 via the stepping signal $\phi 1$ on line 101. Also, each time the strobe signal occurson line 95, a 1 second duration audio tone is generated by the speaker 103, via the 1 second monostable multivibrator 104, audio oscillator 105, AND gate 106, and audio amplifier 107.

The output of the row counter 92 and the output of the latch 97 are coupled as an address input to the read only memory (ROM) 108.

The signals from the row counter 92 and the latch 97 combine to form a composite 7 bit "word," with the four most significant bits of said word designating the active row of the keyboard matrix 91, and the three least significant bits designating the column in which the depressed or actuated key of said row is situated. This word is employed to address the read only memory 108, which has forty memory locations or cells, each cell containing a twelve bit byte, i.e. one byte for each independent key of the keyboards 19 and 26. Each 12 bit byte contains data information corresponding to the numerical value associated with the depressed key (for keys that have such a numerical value associated therewith) and an instruction portion indicating (i) what is to be done with the data portion of the corresponding word or (ii) what functional operation is to be carried out for those keys that do not have a data portion associated therewith.

For example, when the START key 44 is depressed, the address coupled to the read only memory 108 corresponds to row 1, column 1, and a twelve bit data byte is read out from the memory 108 which contains no information in the data portion thereof but contains a code in the operation portion thereof indicating that the START key has been depressed. The operation portion of this date byte, i.e. thre most significant bits thereof, is coupled to a decoder 109, which generates a signal on output line 1 thereof indicating that the START key 44 has been depressed. The read only memory 108 is enabled by a signal on line 110 coupled from the output of the monostable multivibrator 100 on line 101, i.e. the stepping signal $\phi 1$, via OR gate 111. The output of the monostable vibrator 104 on line 112 is also coupled as an input to the OR gate 111 as an enable signal $\phi 2$.

The stepping signal $\phi 1$ is also coupled to set the flip-flop 113 to cause said flip-flop to generate an output signal on line $\overline{Q}$ to enable the data selector 114 for the display 20, 25 (three numerical digits and a sign digit for the display 20 and two numerical digits for the display 25). When the FINISH key 69 is depressed a corresponding FINISH signal is generated by the decoder 109 on line 2 and said signal is coupled to reset the flip-flop 113 to disable the data selector 114 and thus the display 20.

The data selector 114 has two data input lines, i.e. line 115 for receiving the resultant composite color and skin index signals from the total register 116, and an input line 117 for receiving data from the read only memory 108 corresponding to the numerical value associated with a particular depressed key. The data selector 114 couples the individual numerical values on line 117 to output line 118 thereof after the first stripping signal on line 101 has set the flip-flop 113, and couples the total index value information from register 116 on line 115 to output terminal 118 thereof when the flip-flop 113 has been reset by a FINISH signal from the decoder 109.

The display registers 119 receive the display data on line 118 and couple said data to the decoder-multiplexer-driver 120 on line 121 to cause said driver to display the information on line 118 (i) in the display 20 when the row $\geq 6$ signal on line 122 is absent, and (ii) in the display 25 when said signal on line 122 is present.

The row $\geq 6$ signal on line 122 indicates that the skin index section 26 of the analyzer unit 10 is in operation, and therefore the skin index readout 25 is to be utilized. This signal is derived from comparator 123 coupled to the row counter 92, the comparator 123 generating the row $\geq 6$ signal on line 122 whenever the row to which the output of counter 92 on line 23 corresponds has a value equal to or greater than 6.

The decoder-multiplexer-driver 120 operates in well known fashion to operate the individual segments of each numerical section (each section having a seven segment readout) of the display 20 and 25, the decoder-multiplexer-driver 120 being cycled by a clock 124, which may typically comprise an oscillator having a frequency on the order of 20 kHz.

When one of the keys having a numerical value associated therewith is depressed, a corresponding twelve bit byte comprising data and an instruction to add is coupled to the data selector 125 on line 126. The data selector 125 accepts either the data on line 126 or the data on line 127, depending upon the value of the $\overline{SPF}$ signal on line 128.

The monostable multivibrators 104 and 129 generate signals $\phi 2$ and $\phi \overline{1A}$ which are delayed from the stepping signal $\phi 1$, the signals $\phi 2$ and $\phi \overline{1A}$ being utilized to enable various units shown in FIG. 5 a short time after occurrence of the stepping signal $\phi 1$, with a time delay between the signals $\phi 1A$ and $\phi 2$, said signals and the various time delays associated therewith beint provided to eliminate any possibility of race conditions within the arrangement shown in FIG. 5.

When the START key 71 of the skin index section 26 of the analyzer 10 is actuated, a signal is generated on line 130 to reset the row counter 92 to row 6, for proper operation of the skin analysis section 26.

The data selector control signal $\overline{SPF}$ on line 128 is derived via an OR gate 131 whenever a START signal on line 132 or a factor signal on line 133 is present. The factor signal on line 133 is generated whenever one of the skin color tone keys 45 or 46 has been depressed. Corresponding signals indicating the absence of actuation of keys 45 and 46 appear on lines 134 and 135 respectively of the decoder 109 and are coupled to line 133 via an AND gate 136. The signals on lines 133 and 135 are coupled to a flip-flop 137, which provides an output signal on line 138 indicative of that one of the keys 45 or 46 which has been depressed.

Read only memory 139 is utilized only for color index computations, and serves the purpose of adding the numerical values 56, 80, 82, 87 or 111 to the algebraic sum of the values associated with depressed keys of the color index section 19, as illustrated in FIG. 3, the values to be added being determined by the particular range involved. The read only memory 139 is addressed by a three bit address code on lines 138, 140 and 141, said code identifying the particular color index range involved. As previously mentioned, line 138 contains information as to whether the color skin tone is light to medium or medium to deep. The decoder 190 provides output signals on lines 5, 6 and 7 indicating whether the index is in the cool, neutral or warm range. As shown in FIG. 3, depression of key 47, 48 or 49 corresponds to the cool range, depression of key 50 corresponds to the neutral range, and depression of key 51, 52 or 53 corresponds to the warm range. These signals on lines 5 to 7 of the decoder 109 are coupled to a four line to two output bit encoder 142 which provides a two bit code on lines 140 and 141 identifying whether the color index signal is in the cool, neutral or warm range. The three bit code on lines 138, 140 and 141 then addresses a corresponding memory cell within the read only memory 139, to cause generation of an auxiliary numerical value on line 127 as previously mentioned, which value is coupled to the data selector 125.

The $\overline{SPF}$ control signal on line 128 to the data selector 125 is low for skin analysis, i.e. utilizing the section 26, and high for color analysis, i.e. utilizing the section 19 of the aalyzer 10. When a skin analysis is conducted, the numerical values corresponding to depression of selected ones of the keys 72 to 88 are coupled through the data selector 125 on line 126 to the adder 143 on line 144. These values are then added to the contents of the total register 116 (if any) and the resulting output is coupled back to the register 116 on line 145. The register 116 and the adder 143 thus are coupled together in a loop to act as an accumulator. Thus each numerical value associated with a depressed key of the keys 72-88 of the skin analysis section 26 of the analyzer 10 is accumulated within the total register 116, i.e. added to the previous contents of the register, if any, and at the same time coupled through the data collector 114 on line 117 to be displayed by the digital readout 25. When the skin analysis is completed the FINISH signal on line 146 from the decoder 109 resets the flip-flop 113 to cause the data selector 114 to couple the output of the register 116 on line 115 to the display 25, so that the resultant composite skin index signal is displayed.

The arrangement shown in FIG. 5 operates in essentially the same manner for color analysis as it does for skin analysis, one essential difference being that in the skin analysis mode, i.e., when the START button 71 is depressed, the row counter 92 is initially set to enable row 6 rather than row 2, which is enabled when the START key 44 is depressed. The decoder 94 is wired so that row 1, containing both START keys 44 and 71, is always enabled.

The other essential difference between the skin and color analysis modes is that in the color analysis mode the read only memory 135 is utilized, whereas said memory is quiescent in the skin analysis mode.

As previously described, in the skin analysis mode the data selector 125 is set by the signal on line 128 so that it couples the input signal on line 126 to its output line 144, whereas in the color analysis mode said data selector is set so that the signal on line 127 is coupled to output line 144 thereof and thus added to the contents of the accumulator comprising the register 116 and adder 143.

The numerical value designating signals to the data selector 114 on lines 117 and 115 comprise eight and twelve bits respectively. The display register 119 stores in a six digit buffer register (5 decimal digits and 1 sign digit) the values to be displayed corresponding to the displays 20 and 25, and couples display signals therefrom on line 121 to the decoder-multiplexer-driver 120, said signals being coupled from the portion of the buffer register allocated to the display 25 when the row $\geq 6$ signal on line 122 is present, and coupling signals from the portion of the buffer register allocated to the display 20 when said signal on line 122 is absent.

As previously mentioned, if desired, rather than employing descrete functional logic circuit elements such as those shown in FIG. 5, the control of the analyzer 10, and the computation of the color index and skin index numerical values, may be accomplished by a suitably programmed computer.

FIG. 8 is a logical flow diagram showing in some detail the manner in which the analyzer 10 operates. This flow diagram applies both to a hard wired embodiment of the analyzer 10 as illustrated in FIG. 5, and to a computer realization thereof.

FIG. 6 is a wiring diagram of a suitable computer arrangement for controlling the operation of the analyzer 10. The computer arrangement shown in FIG. 6 performs essentially the same functions as the hard wired arrangement shown in FIG. 5. The program utilized by the computer shown in FIG. 6, i.e. by the central processer unit integrated circuit chip 6503 therein, is set forth in assembler language in Table II, and the integrated circuit elements shown in FIG. 6 are described in Table III.

TABLE II

| CAPTION | CONTENT | LABEL | OPERATION |
|---|---|---|---|
| C00$^G$ | | | |
| C00- | A2 DF | LDX | +DF |
| C02- | 9A | TXS | |
| C03- | 78 | SEI | |
| C04- | 20 5A 0E | JSR | 0E5A |
| C07- | A9 00 | LDA | +00 |
| C09- | A2 DF | LDX | +DF |
| C0B- | CA | DEX | |
| C0C- | 95 00 | STA | 00,X |
| C0E- | D0 FB | BNE | 0C0B |
| C10- | A2 00 | LDX | +00 |
| C12- | 8A | TXA | |
| C13- | EA | NOP | |
| C14- | 95 C1 | STA | C1,X |
| C16- | 18 | CLC | |
| C17- | 69 10 | ADC | +10 |
| C19- | E8 | INX | |
| C1A- | E0 06 | CPX | +06 |
| C1C- | D0 F6 | BNE | 0C14 |
| C1E- | A9 FF | LDA | +FF |
| C20- | 8D 03 02 | STA | 0203 |
| C23 | | | |
| C23- | 8D 02 02 | STA | 0202 |
| C26- | A9 0F | LDA | +0F |
| C28- | 85 01 | STA | C1 |
| C2A- | A9 3F | LDA | +3F |
| C2C- | 85 C4 | STA | C4 |
| C2E- | 20 0E 0F | JSR | 0F0E |
| C31- | A9 80 | LDA | +80 |
| C33- | 20 34 0E | JSR | 0E34 |
| C36- | 20 2C 0E | JSR | 0E2C |
| C39- | D0 0F | BNE | 0C4A |
| C3B- | E6 C8 | INC | C8 |
| C3D- | D0 EF | BNE | 0C2E |
| C3F- | E6 C9 | INC | C9 |
| C41- | D0 EB | BNE | 0C2E |
| C43- | C6 CA | DEC | CA |
| C45- | D0 E7 | BNE | 0C2E |
| C47- | 4C 04 0C | JMP | 0C04 |
| C4A- | 85 CC | STA | CC |
| C4C- | A9 01 | LDA | +01 |
| C4E- | 85 CA | STA | CA |
| C50 | | | |
| C50- | A9 00 | LDA | +00 |
| C52- | 85 C9 | STA | C9 |
| C54- | 20 42 0F | JSR | 0F42 |
| C57- | A9 80 | LDA | +80 |
| C59- | 8D 00 02 | STA | 0200 |
| C5C- | 20 2C 0E | JSR | 0E2C |
| C5F- | D0 6A | BNE | 0CCB |
| C61- | A9 00 | LDA | +00 |
| C63- | 8D 00 02 | STA | 0200 |
| C66- | 20 2C 0E | JSR | 0E2C |
| C69- | C5 CC | CMP | CC |
| C6B- | D0 CE | BNE | 0C3E |
| C6D- | C9 01 | CMP | +01 |
| C6F- | D0 26 | BNE | 0C97 |
| C71- | 20 E9 0E | JSR | 0EE9 |
| C74- | 20 2C 0E | JSR | 0E2C |
| C77- | F0 0A | BEQ | 0C83 |
| C79- | 20 0E 0F | JSR | 0F0E |
| C7C- | A9 80 | LDA | +80 |
| C7E- | 20 34 0E | JSR | 0E34 |
| C81 | | | |
| C81- | F0 F1 | BEQ | 0C74 |
| C83- | A0 F0 | LDA | +F0 |
| C85- | 8D 02 02 | STA | 0202 |

TABLE II-continued

| CAPTION | CONTENT | LABEL | OPERATION |
|---|---|---|---|
| C88- | A9 0F | LDA | +0F |
| C8A- | 85 C1 | STA | C1 |
| C8C- | A9 10 | LDA | +10 |
| C8E- | 85 C2 | STA | C2 |
| C90- | A9 20 | LDA | +20 |
| C92- | 85 C3 | STA | C3 |
| C94- | 4C 3B 0C | JMP | 0C3B |
| C97- | C9 02 | CMP | +02 |
| C99- | D0 F9 | BNE | 0C94 |
| C9B- | 20 E9 0E | JSR | 0EE9 |
| C9E- | 20 2C 0E | JSR | 0E2C |
| CA1- | EA | NOP | |
| CA2- | EA | NOP | |
| CA3- | EA | NOP | |
| CA4- | EA | NOP | |
| CA5- | EA | NOP | |
| CA6- | EA | NOP | |
| CA7 | | | |
| CA7- | EA | NOP | |
| CA8- | EA | NOP | |
| CA9- | EA | NOP | |
| CAA- | EA | NOP | |
| CAB- | F0 0A | BEQ | 0CB7 |
| CAD- | 20 0E 0F | JSR | 0F0E |
| CB0- | A9 80 | LDA | +80 |
| CB2- | 20 34 0E | JSR | 0E34 |
| CB5- | F0 E7 | BEQ | 0C9E |
| CB7- | A9 F5 | LDA | +F5 |
| CB9- | 8D 02 02 | STA | 0202 |
| CBC- | A9 3F | LDA | +3F |
| CBE- | 85 C4 | STA | C4 |
| CC0- | A9 40 | LDA | +40 |
| CC2- | 85 C5 | STA | C5 |
| CC4- | A9 50 | LDA | +50 |
| CC6- | 85 C6 | STA | C6 |
| CC8- | 4C 48 0E | JMP | 0E48 |
| CCB- | C5 CC | CMP | CC |
| CCD- | F0 03 | BEQ | 0CD2 |
| CCF | | | |
| CCF- | 4C 3B 0C | JMP | 0C3B |
| CD2- | AD 02 02 | LDA | 0202 |
| CD5- | 29 0F | AND | +0F |
| C7- | 85 D0 | STA | D0 |
| CD9- | D0 28 | BNE | 0D03 |
| CDB- | EE 02 02 | INC | 0202 |
| CDE- | A5 CC | LDA | CC |
| CE0- | C9 01 | CMP | +01 |
| CE2- | F0 19 | BEQ | 0CFD |
| CE4- | A5 CD | LDA | CD |
| CE6- | 29 FE | AND | +FE |
| CE8- | 85 CD | STA | CD |
| CEA- | A9 15 | LDA | +15 |
| CEC- | 85 C2 | STA | C2 |
| CEE- | EA | NOP | |
| CEF- | A9 50 | LDA | +50 |
| CF1- | 85 CE | STA | CE |
| CF3- | A9 00 | LDA | +00 |
| CF5- | 85 CF | STA | CF |
| CF7- | 20 E9 0E | JSR | 0EE9 |
| CFA | | | |
| CFA- | 4C 3B 0C | JMP | 0C3B |
| CFD- | A5 CD | LDA | CD |
| CFF- | 09 01 | ORA | +01 |
| D01 | D0 E5 | BNE | 0CE8 |
| D03- | C9 01 | CMP | +01 |
| D05- | D0 65 | BNE | 0D6C |
| D07 | A5 CD | LDA | CD |
| D09- | 29 F1 | AND | +F1 |
| D0B- | 85 CD | STA | CD |
| D0D- | A5 CC | LDA | CC |
| D0F- | 29 07 | AND | +07 |
| D11- | F0 43 | BEQ | 0D56 |
| D13- | A9 02 | LDA | +02 |
| D15- | 05 CD | ORA | CD |
| D17- | 85 CD | STA | CD |
| D19- | A9 27 | LDA | +27 |
| D1B- | 85 D1 | STA | D1 |
| D1D- | A9 0F | LDA | +0F |
| D1F- | 85 D2 | STA | D2 |

TABLE II-continued
INPUT, CALCULATOR & DISPLAY ALGORITHMS

| CAPTION | CONTENT | LABEL | OPERATION |
|---|---|---|---|
| D21- | A9 00 | LDA | +100 |
| D23 | | | |
| D23- | AA | TAX | |
| D24- | E4 D0 | CPX | D0 |
| D26- | F0 06 | BEQ | 0D2E |
| D28- | E8 | INX | |
| D29- | 18 | CLC | |
| D2A- | 69 07 | ADC | +07 |
| D2C- | D0 F6 | BNE | 0D24 |
| D2E- | A8 | TAY | |
| D2F- | A9 01 | LDA | +01 |
| D31- | C5 CC | CMP | CC |
| D33- | F0 04 | BEQ | 0D39 |
| D35- | 0A | ASL | A |
| D36- | C8 | INY | |
| D37- | D0 F8 | BNE | 0D31 |
| D39- | B1 D1 | LDA | (D1),Y |
| D3B- | 85 D3 | STA | D3 |
| D3D- | A5 C0 | LDA | D0 |
| D3F- | C9 05 | CMP | +05 |
| D41- | 90 08 | BCC | 0D4B |
| D43- | A2 03 | LDX | +03 |
| D45 | | | |
| D45- | 20 5E 0F | JSR | 0F5E |
| D48- | 4C 50 0D | JMP | 0D50 |
| D4B- | A2 00 | LDX | +00 |
| D4D- | 20 5E 0F | JSR | 0F5E |
| D50- | EE 02 02 | INC | 0202 |
| D53- | 4C F7 0C | JMP | 0CF7 |
| D56- | A5 CC | LDA | CC |
| D58- | 29 70 | AND | +70 |
| D5A- | F0 08 | BEQ | 0D64 |
| D5C- | A5 CD | LDA | CD |
| D5E- | 09 04 | ORA | +04 |
| D60- | 85 CD | STA | CD |
| D62- | D0 B5 | BNE | 0D19 |
| D64- | A5 CD | LDA | CD |
| D66- | 09 08 | QRA | +08 |
| D68- | 85 CD | STA | CD |
| D6A- | D0 AD | BNE | 0D19 |
| D6C- | C9 04 | CMP | +04 |
| D6E- | F0 03 | BEQ | 0D73 |
| D70- | 4C CE 0D | JMP | 0DCE |
| D73 | | | |
| D73- | A9 FF | LDA | +FF |
| D75- | 8D 02 02 | STA | 0202 |
| D78- | A5 CD | LDA | 0D |
| D7A- | 29 02 | AND | +02 |
| D7C- | F0 1B | BEQ | 0D99 |
| D7E- | A5 CD | LDA | CD |
| D80- | 29 01 | AND | +01 |
| D82- | F0 0F | BEQ | 0D93 |
| D84- | A9 56 | LDA | +56 |
| D86- | 85 D3 | STA | D3 |
| D88- | 20 A0 0E | JSR | 0EA0 |
| D8B- | A2 00 | LDX | +00 |
| D8D- | 20 63 0E | JSR | 0E63 |
| D90- | 4C F7 0C | JMP | 0CF7 |
| D93- | A9 80 | LDA | +80 |
| D95- | 85 D3 | STA | D3 |
| D97- | D0 EF | BNE | 0D88 |
| D99- | A5 CD | LDA | CD |
| D9B- | 29 04 | AND | +04 |
| D9D- | F0 19 | BEQ | 0DB8 |
| D9F | | | |
| D9F- | A5 CD | LDA | 0D |
| DA1- | 29 01 | AND | +01 |
| DA3- | F0 06 | BEQ | 0DAB |
| DA5- | A9 87 | LDA | +87 |
| DA7- | 85 D3 | STA | D3 |
| DA9- | D0 DD | BNE | 0D88 |
| DAB- | A9 50 | LDA | +50 |
| DAD- | 85 D3 | STA | D3 |
| DAF- | 20 A0 0E | JSR | 0EA0 |
| DB2- | A9 61 | LDA | +61 |
| DB4- | 85 D3 | STA | D3 |
| DB6- | D0 D0 | BNE | 0D88 |
| DB8- | A5 CE | LDA | 0E |
| DBA- | C9 48 | CMP | +48 |
| DBC- | 90 C0 | BCC | 0D7E |
| DBE- | C9 53 | CMP | +53 |
| DC0- | B0 DD | BCS | 0D9F |
| DC2- | A5 CD | LDA | CD |
| DC4- | 29 01 | AND | +01 |
| DC6- | F0 DD | BEQ | 0DA5 |
| DC8- | A9 82 | LDA | +82 |
| DCA- | 85 D3 | STA | D3 |
| DCC- | D0 BA | BNE | 0D88 |
| DCE- | C9 08 | CMP | +08 |
| DD0- | D0 0D | BNE | 0DDF |
| DD2- | A2 03 | LDX | +03 |
| DD4- | 20 63 0E | JSR | 0E63 |
| DD7- | A9 FF | LDA | +FF |
| DD9- | 8D 02 02 | STA | 0202 |
| DDC- | 4C F7 0C | JMP | 0CF7 |
| DDF- | C9 05 | CMP | +05 |
| DE1- | D0 23 | BNE | 0E06 |
| DE3- | A5 CD | LDA | CD |
| DE5- | 29 CF | AND | +CF |
| DE7- | 85 CD | STA | CD |
| DE9- | A5 CC | LDA | CC |
| DEB- | 29 03 | AND | +03 |
| DED- | F0 09 | BEQ | 0DF8 |
| DEF- | A5 CD | LDA | CD |
| DF1- | 09 20 | ORA | +20 |
| DF3 | | | |
| DF3- | 85 CD | STA | CD |
| DF5- | 4C 19 0D | JMP | 0D19 |
| DF8- | A5 CC | LDA | CC |
| DFA- | 29 70 | AND | +70 |
| DFC- | F0 F7 | BEQ | 0DF5 |
| DFE- | A5 CD | LDA | CD |
| E00- | 09 10 | ORA | +10 |
| E02- | 85 CD | STA | CD |
| E04- | D0 EF | BNE | 0DF5 |
| E06- | C9 06 | CMP | +06 |
| E08- | D0 EB | BNE | 0DF5 |
| E0A- | A5 CC | LDA | CC |
| E0C- | 29 02 | AND | +02 |
| EQE- | F0 0D | BEQ | 0E1D |
| E10- | A5 CD | LDA | CD |
| E12- | 29 10 | AND | +10 |
| E14- | F0 DF | BEQ | 0DF5 |
| E16- | A9 BF | LDA | +BF |
| E18- | 8D 02 02 | STA | 0202 |
| E1B- | D0 BF | BNE | 0DDC |
| E1D | | | |
| E1D- | A5 CC | LDA | CC |
| E1F- | 29 20 | AND | +20 |
| E21- | F0 D2 | BEQ | 0DFS |
| E23- | A5 CD | LDA | CD |
| E25- | 29 20 | AND | +20 |
| E27- | F0 CC | BEQ | 0DF5 |
| E29- | 4C 16 0E | JMP | 0E16 |
| E2C- | AD 00 02 | LDA | 0200 |
| E2F- | 09 80 | ORA | +80 |
| E31- | 49 FF | EOR | +FF |
| E33- | 60 | RTS | |
| E34- | 8D 01 02 | STA | 0201 |
| E37- | A9 00 | LDA | +00 |
| E39- | 8D 00 02 | STA | 0200 |
| E3C- | 60 | RTS | |
| E3D- | 85 D4 | STA | D4 |
| E3F- | B5 C1 | LDA | C1,X |
| E41- | 29 F0 | AND | +F0 |
| E43- | 05 D4 | ORA | D4 |
| E45- | 95 C1 | STA | C1,X |
| E47 | | | |
| E47- | 60 | RTS | |
| E48- | A9 50 | LDA | +50 |
| E4A- | 85 CE | STA | CE |
| E4C- | A9 00 | LDA | +00 |
| E4E- | 85 CF | STA | CF |
| E50- | 4C 3B 0C | JMP | 0C3B |
| E53- | 8D 00 02 | STA | 0200 |
| E56- | 8D 01 02 | STA | 0201 |

TABLE II-continued
INPUT, CALCULATOR & DISPLAY ALGORITHMS

| CAPTION | CONTENT | LABEL | OPERATION |
|---|---|---|---|
| E59- | 60 | RTS | |
| E5A- | A9 FF | LDA | +FF |
| E5C- | 8D 03 02 | STA | 0203 |
| E5F- | 20 E9 0E | JSR | 0EE9 |
| E62- | 60 | RTS | |
| E63- | 86 D5 | STX | D5 |
| E65- | A5 CE | LDA | CE |
| E67- | 85 D6 | STA | D6 |
| E69- | A5 CF | LDA | CF |
| E6B- | 85 D7 | STA | D7 |
| E6D- | A9 06 | LDA | +06 |
| E6F- | 85 D8 | STA | DB |
| E71 | | | |
| E71- | A9 94 | LDA | +94 |
| E73- | 85 D3 | STA | D3 |
| E75- | A6 D5 | LDX | D5 |
| E77- | 20 5E 0F | JSR | 0F5E |
| E7A- | 20 E9 0E | JSR | 0EE9 |
| E7D- | 20 A1 0F | JSR | 0FA1 |
| E80- | A6 D5 | LDX | D5 |
| E82- | 20 C0 0E | JSR | 0EC0 |
| E85- | 20 E9 0E | JSR | 0EE9 |
| E88- | 20 A1 0F | JSR | 0FA1 |
| E8B- | C6 D8 | DEC | D8 |
| E8D- | D0 E2 | BNE | 0E71 |
| E8F- | A5 D6 | LDA | D6 |
| E91- | 85 CE | STA | CE |
| E93- | A5 D7 | LDA | D7 |
| E95- | 85 CF | STA | CF |
| E97- | A6 D5 | LDX | D5 |
| E99- | 20 C0 0E | JSR | 0EC0 |
| E9C- | 60 | RTS | |
| E9D- | EA | NOP | |
| E9E | | | |
| E9E- | EA | NOP | |
| E9F- | EA | NOP | |
| EA0- | 18 | CLC | |
| EA1- | F8 | SED | |
| EA2- | A5 CE | LDA | CE |
| EA4- | 65 D3 | ADC | D3 |
| EA6- | 85 CE | STA | CE |
| EA8- | A5 CF | LDA | CF |
| EAA- | 69 00 | ADC | +00 |
| EAC- | 85 CF | STA | CF |
| EAE- | D8 | CLD | |
| EAF- | 60 | RTS | |
| EB0- | 38 | SEC | |
| EB1- | F8 | SED | |
| EB2- | A5 CE | LDA | CE |
| EB4- | E5 D3 | SBC | D3 |
| EB6- | 85 CE | STA | CE |
| EB8- | A5 CF | LDA | CF |
| EBA- | E9 00 | SBC | +00 |
| EBC- | 85 0F | STA | 0F |
| EBE | | | |
| EBE- | D8 | CLD | |
| EBF- | 60 | RTS | |
| EC0- | A5 CF | LDA | CF |
| EC2- | D0 1D | BNE | 0EE1 |
| EC4- | A9 0F | LDA | +0F |
| EC6- | 20 3D 0E | JSR | 0E3D |
| EC9- | EA | NOP | |
| ECA- | E8 | INX | |
| ECB- | A5 CE | LDA | CE |
| ECD- | 29 F0 | AND | +F0 |
| ECF- | 4A | LSR | A |
| ED0- | 4A | LSR | A |
| ED1- | 4A | LSR | A |
| ED2- | 4A | LSR | A |
| ED3- | 20 3D 0E | JSR | 0E3D |
| ED6- | EA | NOP | |
| ED7- | E8 | INX | |
| ED8- | A5 CE | LDA | CE |
| EDA- | 29 0F | AND | +0F |
| EDC- | 20 3D 0E | JSR | 0E3D |
| EDF | | | |
| EDF- | EA | NOP | |
| EE0- | 60 | RTS | |
| EE1- | A9 0E | LDA | +0E |

TABLE II-continued
INPUT, CALCULATOR & DISPLAY ALGORITHMS

| CAPTION | CONTENT | LABEL | OPERATION |
|---|---|---|---|
| EE3- | 20 3D 0E | JSR | 0E3D |
| EE6- | EA | NOP | |
| EE7- | D0 E1 | BNE | 0ECA |
| EE9- | A0 00 | LDY | +00 |
| EEB- | EA | NOP | |
| EEC- | EA | NOP | |
| EED- | EA | NOP | |
| EEE- | EA | NOP | |
| EEF- | AD 02 02 | LDA | 0202 |
| EF2- | 49 10 | EDR | +10 |
| EF4- | 8D 02 02 | STA | 0202 |
| EF7- | 20 0E 0F | JSR | 0F0E |
| EFA- | C8 | INY | |
| EFB- | C0 F0 | CPY | +F0 |
| EFD- | D0 EE | BNE | 0EED |
| EFF- | 60 | RTS | |
| F00- | C6 C0 | DEC | C0 |
| F02 | | | |
| F02- | D0 FC | BNE | 0F00 |
| F04- | 60 | RTS | |
| F05 | E6 C0 | INC | C0 |
| F07 | D0 FC | BNE | 0F05 |
| F09- | C6 CB | DEC | CB |
| F0B- | D0 F8 | BNE | 0F05 |
| F0D- | 60 | RTS | |
| F0E- | A9 7F | LDA | +7F |
| F10- | 20 53 0E | JSR | 0E53 |
| F13- | A6 C7 | LDX | C7 |
| F15- | B5 C1 | LDA | C1,X |
| F17- | 8D 00 02 | STA | 0200 |
| F1A- | A9 30 | LDA | +30 |
| F1C- | 85 C0 | STA | C0 |
| F1E- | 20 00 0F | JSR | 0F00 |
| F21- | A5 C7 | LDA | C7 |
| F23- | C9 05 | CMP | +05 |
| F25- | D0 04 | BNE | 0F2B |
| F27- | A9 FF | LDA | +FF |
| F29- | 85 C7 | STA | C7 |
| F2B | | | |
| F2B- | E6 C7 | INC | C7 |
| F2D- | 60 | RTS | |
| F2E- | | | |
| F31- | | | |
| F33- | 94 A0 | STY | A0,X |
| F35- | 00 | BRK | |
| F36- | 05 03 | ORA | 03 |
| F38- | 80 83 | ??? | +83 |
| F3A- | 85 00 | STA | 00 |
| F3C- | 00 | BRK | |
| F3D- | 01 01 | ORA | (01,X) |
| F3F- | 80 81 | ??? | +81 |
| F41- | 81 A9 | STA | (A9,X) |
| F43- | 02 | ??? | |
| F44- | 85 CB | STA | CB |
| F46- | 20 05 0F | JSR | 0F05 |
| F49- | 60 | RTS | |
| F4A- | 15 10 | ORA | 10,X |
| F4C- | 05 80 | ORA | 80 |
| F4E- | 85 90 | STA | 90 |
| F85 | | | |
| F85- | 4A | LSR | A |
| F86- | 4A | LSR | A |
| F87- | 4A | LSR | A |
| F88- | 20 3D 0E | JSR | 0E3D |
| F8B- | EA | NOP | |
| F8C- | E8 | INX | |
| F8D- | A5 D3 | LDA | D3 |
| F8F- | 29 0F | AND | +0F |
| F91- | 20 3D 0E | JSR | 0E3D |
| F94- | EA | NOP | |
| F95- | 60 | RST | |
| F96- | 20 B0 0E | JSR | 0EB0 |
| F99- | B5 C1 | LDA | C1,X |
| F9B- | 29 F0 | AND | +F0 |
| F9D- | 09 0B | ORA | +0B |
| F9F- | D0 D2 | BNE | 0F73 |
| FA1- | A0 35 | LDY | +35 |
| FA3- | 20 0E 0F | JSR | 0F0E |
| FA6- | 88 | DEY | |

TABLE II-continued

INPUT, CALCULATOR & DISPLAY ALGORITHMS

| CAPTION | CONTENT | LABEL | OPERATION |
|---------|---------|-------|-----------|
| FA7-FA9 | D0 FA | BNE | 0FA3 |
| FA9- | 60 | RTS | |

WH 0FF8 0FFF
080FF805AB000C000C000C02A3
M 0FF8 C5 AB 00 0C 00 0C 00 0C

TABLE III

| PART NUMBER | DESCRIPTION |
|-------------|-------------|
| 6503 | Central Processor Unit - Available from MOS Technology Inc. Morristown, Pennsylvania. |
| 6504 | Inverters |
| 2708 | Read Only Memory - Available from Texas Instruments - Dallas, Texas |
| 6530 | Peripheral Adapter - Available from MOS Technology Inc. |
| 74L46 | Binary Coded Decimal Decoder (Seven Segment) - Available from Texas Instruments. |
| 74S138 | |
| 7442A | Binary Coded Decimal Decoder - Available from Texas Instruments |
| IEE 1745 | Seven Segment Display with Sign Digit - Available From Industrial Electronic Engineers Van Nuys, California |
| IEE 1725 | Seven Segment Display without Sign Digit - Available From Industrial Electronic Engineers |

While the analyzer unit 10 provides specific color index and skin index values for each individual, the cosmetic display unit 11 divides the color index values into six discrete ranges, while the cosmetic display unit 12 divides the skin index values into four discrete ranges. It should be understood, however, that if desired the display units 11 and 12 may be readily modified to divide the corresponding index values into as many ranges as desired. When the aforementioned display units 11 and 12 are utilized, the individual utilizing the same may be provided with literature giving further information as to selection of cosmetics within the particular index ranges in which her cosmetic determining characteristics fall.

The assignment of numerical values to the various cosmetic determining characteristics to which the analyzer 10 relates have been determined by knowledgable beauty experts, and the resulting index values have been found by said experts to be properly indicative of the color imparting cosmetic (for the color index) and the skin preparation cosmetic (for the skin index) requirements of various individuals.

What is claimed is:

1. A cosmetic selection device, comprising:
   a numerical accumulator;
   a keyboard comprising a first series of rows of keys for generating first coded signals representing numerical values corresponding to various personal color characteristics, and a second series of rows of keys for generating second coded signals representing numerical values corresponding to various personal skin characteristics;
   means for coupling said first and second coded signals to said accumulator to cause said accumulator to store (i) a color index signal having a value corresponding to the algebraic sum of the values corresponding to said first coded signals, and (ii) a skin index signal having a value corresponding to the algebraic sum of the values corresponding to said second coded signals,
   said color index signal being indicative of selected ones of a group of skin color imparting cosmetics most suitable for use by an individual having said personal color characteristics, and said skin index signal being indicative of selected ones of a group of skin preparation cosmetics most suitable for use by an individual having said personal skin characteristics;
   first selection means for designating the suitable selected ones of said color imparting cosmetics corresponding to said color index signal; and
   second selection means for designating the suitable selected ones of said skin preparation cosmetics corresponding to said skin index signal.

2. The device according to claim 1, further comprising means for generating said coded signals in response to the actuation of only one key of each row of keys.

3. The device according to claim 2, further comprising means for disabling the other keys of each row when one key of the row is actuated.

4. The device according to claim 1, further comprising means for generating an audible signal when a key of each of said rows is actuated.

5. The device according to claim 1, further comprising illuminating means for initially illuminating an area adjacent the first row of each of said series of rows, for illuminating an area adjacent the second row thereof when a key of the first row is actuated, and for thereafter illuminating an area adjacent each subsequent row when a key of the preceding row is actuated.

6. The device according to claim 1, wherein said first selection means designates a first plurality of combinations of said skin color imparting cosmetics and said second selection means designates a second plurality of combinations of said skin preparation cosmetics, each of said first plurality of combinations correspondng to a predetermined range of values of said color index signal, and each of said second plurality of combinations corresponding to a predetermined range of values of said skin index signal.

7. The device according to claim 6, wherein said first plurality comprises six combinations of said skin color imparting cosmetics and said second plurality comprises four combinations of said skin preparation cosmetics.

8. The device according to claim 1, wherein said first and second selection means designate suitable cosmetics by illuminating a region adjacent each selected skin preparation and skin color imparting cosmetic.

9. The device according to claim 1, further comprising means for displaying the values of said index signals.

10. A cosmetic selection device, comprising:
    keyboard means for generating coded signals representing positive and negative numerical values corresponding to various cosmetic determining characteristics of an individual;
    means for combining said coded signals to provide a numerical index signal having a value indicative of a suitable combination of cosmetics selected from a plurality of combinations of cosmetics for use by said individual; and
    selection means for designating said suitable combination of cosmetics corresponding to the value of said index signal.

11. The device according to claim 10, wherein said cosmetic determining characteristics comprise personal color characteristics and personal skin characteristics.

12. A cosmetic selection device according to claim 10 wherein said index signal comprises a color index signal and a skin index signal.

13. A cosmetic analysis device, comprising:
- a keyboard having a plurality of keys for generating corresponding coded signals having associated positive and negative numerical values indicative of various cosmetic determining characteristics of an individual
- means responsive to said coded signals for generating a composite cosmetic determining signal having a numerical value corresponding to the combination of the actuated ones of said keys; and
- means for displaying said composite signal value.

14. A color index determining device for generating a color index signal having a value indicative of suitable skin color imparting cosmetics for an individual, comprising:
- a keyboard having a series of rows of keys for generating coded signals corresponding to individual complexion color range, skin tone, hair color and eye color characteristics;
- each of said coded signals having a numerical value and a sign associated therewith;
- means for algebraically adding said numerical values to generate a resultant individual color index signal; and
- display means for utilizing said color index signal to designate said suitable cosmetics.

15. A skin index determining device for generating a skin index signal having a value indicative of suitable skin preparation cosmetics for an individual, comprising:
- a keyboard having a series of rows of keys for generating coded signals corresponding to individual skin oiliness; makeup effect, and soap and water cleansing effect characteristics;
- each of said coded signals having a numerical value and a sign associated therewith;
- means for algebraically adding said numerical values to generate a resultant individual skin index signal; and
- display means for utilizing said skin index signal to designate said suitable cosmetics.

16. A cosmetic selection device, comprising:
- a numerical accumulator;
- a keyboard comprising a series of rows of keys for generating coded signals representing numerical values corresponding to various personal color characteristics,
- means for coupling said coded signals to said accumulator to cause said accumulator to store a color index signal having a value corresponding to the algebraic sum of the values corresponding to said coded signals,
- said color index signal being indicative of selected ones of a group of skin color imparting cosmetics most suitable for use by an individual having said personal color characteristics; and
- selection means for designating the suitable selected ones of said skin color imparting cosmetics corresponding to said color index signal.

17. A cosmetic selection device, comprising:
- a numerical accumulator;
- a keyboard comprising series of rows of keys for generating coded signals representing numerical values corresponding to various personal skin characteristics;
- means for coupling said coded signals to said accumulator to cause said accumulator to store a skin index signal having a value corresponding to the algebraic sum of the values corresponding to said coded signls,
- said skin index signal being indicative of selected ones of a group of skin preparation cosmetics most suitable for use by an individual having said personal skin characteristics; and
- selection means for designating the suitable selected ones of said skin preparation cosmetics corresponding to said skin index signal.

* * * * *

UNITED STATES PATENT AND TRADEMARK OFFICE
CERTIFICATE OF CORRECTION

PATENT NO. : 4,160,271

DATED : July 3, 1979

INVENTOR(S) : Suzanne Grayson, et al

It is certified that error appears in the above—identified patent and that said Letters Patent is hereby corrected as shown below:

Column 1, line 45: "in" should be --is--.

Column 3, line 51: "signa" should be --signal--.

Column 4, line 32: "1, 2, 3, 4, 5" should be --1, 2, 3, 4, 4, 5--.

Column 5, line 34: "correspoind-" should be --correspond- --.

Column 9, line 62: "occurson" should be --occurs on--.

Column 10, line 26: "date" should be --data--; "thre" should be --three--.

Column 11, line 22: " $\phi$1A" should be -- $\phi\overline{1A}$--.

line 23: "beint" should be --being--.

Column 12, line 4: "aalyzer" should be --analyzer--.

line 59: "descrete" should be --discrete--.

UNITED STATES PATENT AND TRADEMARK OFFICE
CERTIFICATE OF CORRECTION

PATENT NO. : 4,160,271

DATED : July 3, 1979

INVENTOR(S) : Suzanne Grayson, et al

It is certified that error appears in the above—identified patent and that said Letters Patent is hereby corrected as shown below:

Column 20, line 12: Before "color" insert --skin--.

*Signed and Sealed this*

*Twenty-seventh* Day of *May 1980*

[SEAL]

Attest:

SIDNEY A. DIAMOND

Attesting Officer

Commissioner of Patents and Trademarks